(12) United States Patent
Young et al.

(10) Patent No.: US 11,313,386 B2
(45) Date of Patent: Apr. 26, 2022

(54) SPATIALLY CONTROLLABLE EDUCTOR FOR MANAGING SOLID ADDITIVES AND PROCESSES USING SAME

(71) Applicant: The Procter & Gamble Company, Cincinnati, OH (US)

(72) Inventors: Christopher Michael Young, Loveland, OH (US); Fei Wang, Mason, OH (US); Steven Lee Barnholtz, West Chester, OH (US); Hasan Eroglu, Liberty Township, OH (US); Edwin Arthur Stewart, Cincinnati, OH (US); John Ferney McKibben, West Chester, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 135 days.

(21) Appl. No.: 16/902,311

(22) Filed: Jun. 16, 2020

(65) Prior Publication Data

US 2020/0309157 A1 Oct. 1, 2020

Related U.S. Application Data

(63) Continuation of application No. 14/970,583, filed on Dec. 16, 2015, now Pat. No. 10,683,878.

(Continued)

(51) Int. Cl.
*F04F 5/24* (2006.01)
*B01F 5/04* (2006.01)
(Continued)

(52) U.S. Cl.
CPC .............. *F04F 5/24* (2013.01); *B01F 5/0426* (2013.01); *B01F 15/00344* (2013.01);
(Continued)

(58) Field of Classification Search
CPC ..... B01F 15/00344; B01F 5/0426; F04F 5/10; F04F 5/24; D01D 5/0985; D01D 5/00;
(Continued)

(56) References Cited

U.S. PATENT DOCUMENTS 4,781,467 A ‡ 11/1988 Williams ................ B01F 3/088
137/599.12
4,902,559 A ‡ 2/1990 Eschwey .............. D04H 1/4258
442/33

(Continued)

FOREIGN PATENT DOCUMENTS

WO 2016100249 A1 6/2016
WO WO-2016100249 A1 ‡ 6/2016 ............... B32B 5/00

OTHER PUBLICATIONS

U.S. Appl. No. 14/970,586, filed Dec. 16, 2015.
(Continued)

*Primary Examiner* — Matthew W Jellett
*Assistant Examiner* — Christopher D Ballman
(74) *Attorney, Agent, or Firm* — C. Brant Cook

(57) ABSTRACT

A spatially controllable, for example CD controllable, eductor, and more particularly an eductor that is capable of providing a variable motive fluid and processes using such an eductor are provided.

20 Claims, 22 Drawing Sheets

Related U.S. Application Data

(60) Provisional application No. 62/170,176, filed on Jun. 3, 2015, provisional application No. 62/094,087, filed on Dec. 19, 2014.

(51) Int. Cl.

| | | |
|---|---|---|
| *B01F 15/00* | (2006.01) | |
| *F04F 5/10* | (2006.01) | |
| *D04H 1/4382* | (2012.01) | |
| *D01D 5/00* | (2006.01) | |
| *D01D 5/098* | (2006.01) | |
| *D04H 1/407* | (2012.01) | |
| *D04H 1/425* | (2012.01) | |
| *D04H 1/56* | (2006.01) | |
| *D04H 1/70* | (2012.01) | |
| *D04H 1/72* | (2012.01) | |
| *D04H 1/736* | (2012.01) | |
| *B32B 5/00* | (2006.01) | |
| *D04H 1/00* | (2006.01) | |

(52) U.S. Cl.
    CPC .......... *D04H 1/43835* (2020.05); *F04F 5/10* (2013.01); *B32B 5/00* (2013.01); *D01D 5/00* (2013.01); *D01D 5/0985* (2013.01); *D04H 1/00* (2013.01); *D04H 1/407* (2013.01); *D04H 1/425* (2013.01); *D04H 1/4382* (2013.01); *D04H 1/56* (2013.01); *D04H 1/70* (2013.01); *D04H 1/72* (2013.01); *D04H 1/736* (2013.01)

(58) Field of Classification Search
    CPC ...... D04H 1/407; D04H 1/425; D04H 1/4382; D04H 1/56; D04H 1/70; D04H 1/72; D04H 1/736; D04H 1/43835; D04H 1/00; B32B 5/00
    See application file for complete search history.

(56) References Cited

U.S. PATENT DOCUMENTS

| | | | | |
|---|---|---|---|---|
| 5,451,348 | A ‡ | 9/1995 | Kingsley | B01F 3/04609 261/36.1 |
| 5,569,489 | A ‡ | 10/1996 | Kasmark, Jr. | D04H 1/72 118/63 |
| 5,807,795 | A * | 9/1998 | Lau | D01D 4/025 442/334 |
| 6,379,136 | B1 ‡ | 4/2002 | Najour | D04H 3/16 425/46 |
| 7,014,441 | B2 ‡ | 3/2006 | Haynes | D01D 4/025 425/66 |
| 9,114,367 | B1 ‡ | 8/2015 | Thomas | B01F 5/0426 |
| 9,242,260 | B2 ‡ | 1/2016 | Stevenson | B05B 7/30 |
| 9,382,922 | B2 ‡ | 7/2016 | Dunning | F04F 5/44 |
| 2003/0111774 | A1 * | 6/2003 | Kellenberger | D04H 3/02 264/518 |
| 2003/0117741 | A1 ‡ | 6/2003 | Kusumoto | G11B 5/54 360/75 |
| 2005/0003156 | A1 ‡ | 1/2005 | Fereshtehkhou | A47L 13/20 428/14 |
| 2005/0087287 | A1 ‡ | 4/2005 | Lennon | D01D 5/0985 156/16 |
| 2008/0152580 | A1 ‡ | 6/2008 | Simpson | B01F 3/0446 423/477 |
| 2010/0048072 | A1 ‡ | 2/2010 | Kauschke | A47L 13/16 442/1 |
| 2011/0104419 | A1 ‡ | 5/2011 | Barnholtz | D04H 1/56 428/36 |
| 2011/0152808 | A1 ‡ | 6/2011 | Jackson | A61F 13/15658 604/36 |
| 2012/0227203 | A1 ‡ | 9/2012 | Ouellette | A47L 13/16 15/209 |
| 2014/0001278 | A1 ‡ | 1/2014 | Hagquist | A62C 5/002 239/10 |
| 2015/0167441 | A1 ‡ | 6/2015 | Howell | E21B 41/00 166/280.1 |
| 2015/0298073 | A1 ‡ | 10/2015 | Ray | B01F 7/24 106/638 |
| 2016/0354736 | A1 | 12/2016 | Young et al. | |

OTHER PUBLICATIONS

U.S. Appl. No. 14/970,581, filed Dec. 16, 2015.
PCT International Search Report dated Mar. 18, 2016—5 pages.
PCT International Search Report dated Apr. 4, 2016—6 pages.
PCT International Search Report dated Mar. 31, 2016—6 pages.
All Office Actions in U.S. Appl. No. 14/970,581, U.S. Appl. No. 14/970,581 and U.S. Appl. No. 14/970,581.

\* cited by examiner
‡ imported from a related application

SPATIALLY CONTROLLABLE EDUCTOR FOR MANAGING SOLID ADDITIVES AND PROCESSES USING SAME

FIELD OF THE INVENTION

The present invention relates to an eductor, and more particularly to a spatially controllable eductor, for example a cross-machine direction (CD) controllable eductor, that is capable of managing and/or manages solid additives passing through the eductor, and even more particularly to a spatially controllable eductor, for example a CD controllable eductor that is capable of being manipulated during operation of the eductor to control pressure, velocity, mass, and/or flow CD profiles of a mixed fluid containing solid additives within the eductor's fluid mixing chamber, and processes using such an eductor.

BACKGROUND OF THE INVENTION

Eductors are pieces of equipment that are used to continuously mix and/or combine two or more fluids within a fluid mixing chamber defined by an eductor's housing. After mixing within the fluid mixing chamber, the eductor then discharges the mixed fluid through one or more fluid outlets, which are in fluid communication with the fluid mixing chamber. Oftentimes the eductors manage two or more different fluids, such as different air streams, for example an entrained air stream and a motive air stream, without solid additives contained in either air stream. Examples of such eductors include eductors that are utilized with jet engines to cool the exhaust. However, some eductors do manage at least one fluid that contains solid additives, for example pulp fibers, that mixes with another fluid, such as air only.

One problem of known eductors is that the mixed fluid within the fluid mixing chamber of the eductors and the mixed fluid exiting the eductors' fluid outlet is spatially non-controllable, especially when the entrained fluid comprises a plurality of solid additives, such as fibers, for example pulp fibers. In other words, the distribution of solid additives, especially in the cross-machine direction, present in the entrained fluid cannot be controlled in known eductors, which results in a random distribution of the solid additives within the fluid mixing chamber and in the mixed fluid exiting the eductor's fluid outlet.

It is believed that this non-controllability of the mixed fluid within the eductors' fluid mixing chamber and thus the mixed fluid exiting the eductors' fluid outlet is caused by the lack of ability of the eductors to be CD controllable, for example to provide a variable motive fluid into their respective fluid mixing chambers to create less non-uniformity and/or more uniformity and/or uniformity in the mixed fluid's CD profile, especially if the mixed fluid comprises a plurality of solid additives, such as fibers, for example pulp fibers.

As shown in Prior Art FIGS. 1A-1C, an example of a known non-spatially controllable, for example non-CD controllable, eductor 10 having a housing 12 that lacks the ability to create and provide a variable motive fluid to its fluid mixing chamber 14. As shown in FIGS. 1A-1C, the eductor 10 comprises a housing 12 that defines a fluid mixing chamber 14, an entrained fluid inlet 16, an invariable motive fluid inlet 18 (for example a non segmented, not two or more discrete, separated zones as clearly shown in FIG. 1C), such that the motive fluid entering the fluid mixing chamber 14 from the invariable motive fluid inlet 18 would not create a variable motive fluid (for example would not have two or more zones that differ in properties, such as pressure, velocity, mass, and/or flow), and a fluid outlet 20, for example a mixed fluid outlet. The entrained fluid inlet 16, invariable motive fluid inlet 18, fluid outlet 20, and the fluid mixing chamber 14 are in fluid communication with each other during operation of the eductor 10, but the eductor offers no way to spatially control the mixed fluid, for example control the CD profile of the mixed fluid, especially if the mixed fluid contains a plurality of solid additives.

Further, most of such known non-spatially controllable eductors have a circular cross-section fluid mixing chamber, like the one shown in FIGS. 1A-1C, and are incapable of creating and/or providing a variable motive fluid during operation of the eductors and thus lack the ability to manipulate the mixed fluids within the eductors with respect to the mixed fluids' CD profiles, such as pressure, velocity, mass and/or flow CD profiles.

Prior Art FIGS. 2A-2C illustrate an example of another known eductor 10 comprising a housing 12 that exhibits a non-circular cross-section (a polygonal, such as rectangular, or elliptical cross-section) fluid mixing chamber 14. This eductor 10 manipulates an induced gas, for example air stream (entrained air stream) represented by arrows A entering the eductor 10 through its entrained fluid inlet 16 by placing steering vanes 22 within the fluid mixing chamber 14 to selectively guide the induced air stream A to direct pulp fibers 24 within its motive fluid, its invariable motive fluid stream represented by arrows B entering the eductor 10 through its invariable motive fluid inlet 18 (for example a non-segmented, not discrete, separated zones as clearly shown in FIG. 2C, which has a portion of the housing 12 broken away) such that the motive fluid entering the fluid mixing chamber 14 from the invariable motive fluid inlet 18 would not create a variable motive fluid (for example would not have two or more zones that differ in properties, such as pressure, velocity, mass, and/or flow), toward selected areas of a collection device, such as a belt (not shown). It too, like its circular cross-section cousins, is incapable of creating and providing a variable motive fluid during operation of the eductor 10, thereby relying on changes in the baffle positions on the entrained fluid side of the eductor to effect the velocity profile in the CD direction. The presence of these baffles prevents the introduction of particles into this stream and limits the applications to which this technology can be applied.

Another known eductor is shown in U.S. Pat. No. 4,400,138 that shows an eductor with multiple, adjustable motive air inlets. The cross section of this eductor, however, is circular, with an CD/MD ratio of 1.0. Since these adjustable motive air nozzles are evenly spaced around the eductor discharge, there is no ability of this device to adjust flow in the cross direction, and thus is a non-spatially controllable, non-CD controllable eductor.

Still another known eductor is shown in U.S. Pat. No. 7,014,441 that illustrates a planar eductor with a high aspect ratio (CD/MD) with adjustable motive air nozzles. As can be seen from its figures, this eductor is not, however, controllable and/or adjustable in the CD, but only in the machine direction.

Additional descriptions of known eductors and their properties and operation are described in the following references: Blevins, Robert D, "Applied Fluid Dynamics Handbook", section 9.5, ISBN 1-57524-182-x; Young, Munson, and Okiishi, "A Brief Introduction to Fluid Mechanics" ISBN 0-471-13771-5; Silvester, R. and N. H. G. Mueller, "Design Data for the Liquid-Liquid Jet Pump", J. Hydraulics Res. 6, 129-168 (1968); and Mueller, N. H. G., "Water Jet Pump," ASCE J. Hydraulics Div. 90, 83-113 (1964).

In light of the foregoing, there is a need for a spatially controllable, for example CD controllable eductor, especially an eductor that manages the flow of solid additives, for example pulp fibers, that is capable of creating and/or providing a variable motive fluid, and more particularly controlling and/or adjusting the CD profile of the mixed fluid within the eductor in order to influence the mixed fluid of the eductor and result in a never-before achievable result in the exiting mixed fluid and/or ultimately a product made from the exiting mixed fluid. Further, there is a need for an eductor that is a CD controllable eductor that is capable of being manipulated during operation of the eductor to control and/or adjust the pressure, velocity, mass and/or flow CD profiles of the mixed fluid within the eductor, for example within the eductor's fluid mixing chamber, and processes using such an eductor.

SUMMARY OF THE INVENTION

The present invention fulfills the needs described above by providing a CD controllable eductor, especially a CD controllable eductor that is capable of managing solid additives passing through the eductor and/or that is capable of creating and/or providing a variable motive fluid, and even more particularly to an eductor that exhibits a non-circular cross-section fluid mixing chamber wherein the motive fluid entering the fluid mixing chamber is a variable motive fluid, and even more particularly to a cross-machine direction (CD) controllable eductor, for example that is capable of being manipulated during operation of the eductor to control and/or adjust pressure, velocity, mass and/or flow CD profiles of the mixed fluid within the eductor's fluid mixing chamber, and processes using such an eductor.

One solution to the problem described above is a spatially controllable eductor, for example a CD controllable eductor, and/or a spatially controllable, for example CD controllable, eductor, in other words, an eductor that is capable of providing a variable motive fluid and/or an eductor that exhibits a non-circular cross-section fluid mixing chamber wherein the motive fluid entering the fluid mixing chamber is a variable motive fluid, and/or a CD controllable eductor, for example an eductor that is capable of being manipulated during operation of the eductor to control and/or adjust pressure, mass and/or flow and/or velocity CD profiles of the mixed fluid within the eductor's fluid mixing chamber.

In one example of the present invention, a spatially controllable, for example CD controllable spatially controllable, for example CD controllable, eductor, is provided.

In another example of the present invention, a spatially controllable, for example CD controllable, eductor that is capable of creating and/or providing a variable motive fluid, is provided.

In another example of the present invention, a spatially controllable, for example CD controllable, eductor comprising one or more variable motive fluid inlets, is provided.

In another example of the present invention, a spatially controllable, for example CD controllable, eductor comprising a housing having an entrained fluid inlet, a fluid outlet, and a variable motive fluid inlet, all of which are in fluid communication with one another, is provided.

In another example of the present invention, a spatially controllable, for example CD controllable, eductor comprising a housing having an entrained fluid inlet, a fluid outlet, and two or more motive fluid inlets all of which are in fluid communication with one another, wherein at least one and/or at least two of the two or more motive fluid inlets is a variable motive fluid inlet, for example is independently controllable to manage the flow of a motive fluid through the motive fluid inlets during operation of the eductor, is provided.

In still another example of the present invention, a spatially controllable, for example CD controllable, eductor that exhibits a non-circular cross-section fluid mixing chamber wherein the motive fluid entering the fluid mixing chamber is a variable motive fluid, is provided.

In another example of the present invention, a spatially controllable, for example CD controllable, eductor comprising a housing having an entrained fluid inlet, a fluid outlet, a non-circular cross-section fluid mixing chamber, and one or more, for example two or more, motive fluid inlets all of which are in fluid communication with one another such that during operation of the eductor, one or more of the following profiles: pressure, velocity, mass, and/or flow of an entrained fluid entering the housing is adjusted prior to exiting the fluid outlet of the housing, is provided.

In yet another example of the present invention, a CD controllable eductor, for example that is capable of being manipulated during operation of the eductor to control and/or adjust the pressure, velocity, mass, and/or flow CD profiles of the fluid within the eductor, for example within the eductor's fluid mixing chamber, is provided.

In another example of the present invention, a spatially controllable, for example CD controllable, eductor comprising a housing having an entrained fluid inlet, a fluid outlet, a fluid mixing chamber, and one or more, for example two or more, motive fluid inlets all of which are in fluid communication with one another such that during operation of the eductor, one or more of the following profiles: pressure, velocity, mass, and/or flow of an entrained fluid entering the housing is controlled and/or adjusted prior to exiting the fluid outlet of the housing, is provided.

In another example of the present invention, a spatially controllable, for example CD controllable, eductor comprising a housing having an entrained fluid inlet, a fluid outlet, and two or more motive fluid inlets all of which are in fluid communication with one another, wherein at least two of the two or more motive fluid inlets are independently controllable to manage the flow of a motive fluid through the motive fluid inlets during operation of the eductor, is provided.

In still another example of the present invention, a solid additive system comprising a solid additive source and a spatially controllable, for example CD controllable, eductor comprising a housing having an entrained fluid inlet and a fluid outlet, wherein the solid additive source is in fluid communication with the entrained fluid inlet and fluid outlet such that during operation of the eductor an entrained fluid entering the eductor through the entrained fluid inlet comprises a plurality of solid additives exhibiting a first CD profile, for example pressure, velocity, mass, and/or flow CD profile, and the fluid exiting the fluid outlet comprises the plurality of solid additives exhibiting a second CD profile, for example pressure, velocity, mass, and/or flow CD profile that is different from the first CD profile, is provided.

In still another example of the present invention, a solid additive system comprising a solid additive source and a spatially controllable, for example CD controllable, eductor comprising a housing having an entrained fluid inlet and a fluid outlet, wherein the solid additive source is in fluid communication with the entrained fluid inlet and fluid outlet such that a fluid exiting the fluid outlet is wider (in the MD and/or CD) than the fluid entering the entrained fluid inlet from the solid additive source during operation of the eductor, is provided.

In even another example of the present invention, a spatially controllable, for example CD controllable, eductor comprising a housing having an entrained fluid inlet and a fluid outlet both of which are in fluid communication with one another such that a fluid exiting the fluid outlet is wider (in the MD and/or CD) than the fluid entering the entrained fluid inlet during operation of the eductor, is provided.

In even yet another example of the present invention, a process for managing an entrained fluid, the process comprising the steps of:
 a. providing a spatially controllable, for example CD controllable, eductor according to the present invention; and
 b. injecting an entrained fluid, for example an entrained fluid comprising a plurality of solid additives, into the eductor, is provided.

In still yet another example of the present invention, a process for making a managing solid additives, the process comprising the steps of:
 a. providing a fluid comprising solid additives;
 b. injecting the fluid comprising solid additives as an entrained fluid into a spatially controllable, for example CD controllable, eductor according to the present invention;
 c. injecting a motive fluid, for example a variable motive fluid, into the eductor such that the entrained fluid comprising solid additives and the motive fluid mix in the eductor's mixing chamber to form a mixed fluid comprising solid additives;
 d. passing the mixed fluid comprising solid additives from the eductor to a forming box that is in fluid communication with the eductor; and
 e. depositing the solid additives from the mixed fluid comprising solid additives onto a collection device from the forming box, is provided.

In even still yet another example of the present invention, a process for managing solid additives, the process comprising the steps of:
 a. providing a fluid comprising solid additives;
 b. injecting the fluid comprising solid additives as an entrained fluid into a spatially controllable, for example CD controllable, eductor according to the present invention;
 c. injecting a motive fluid, for example a variable motive fluid, into the eductor such that the entrained fluid comprising solid additives and the motive fluid mix in the eductor's mixing chamber to form a mixed fluid comprising solid additives;
 d. passing the mixed fluid comprising solid additives from the eductor to a forming box that is in fluid communication with the eductor;
 e. introducing filaments into the forming box such that the filaments and the solid additives mix in the forming box to form a mixed material; and
 f. depositing the mixed material onto a collection device from the forming box, is provided.

The present invention provides novel eductors as described above and processes using such eductors.

DETAILED DESCRIPTION OF THE INVENTION

Definitions

Figure 1A:
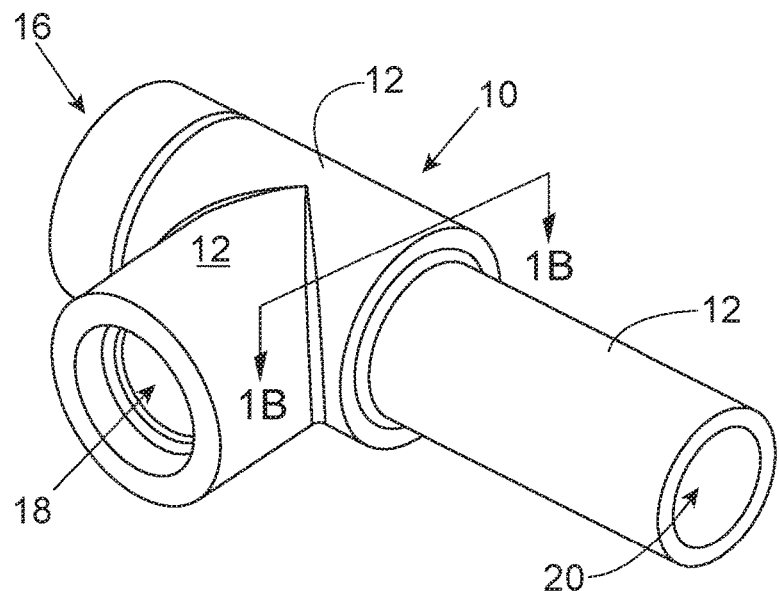
FIG. 1A is a perspective view of an example of a prior art non-spatially controllable eductor.
Figure 1B:
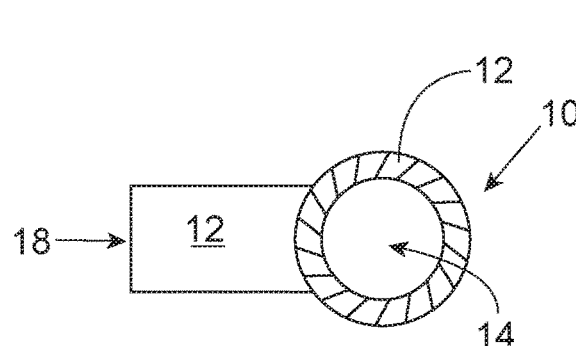
FIG. 1B is a cross-sectional view of the prior art eductor of FIG. 1A taken along line 1B-1B.
Figure 1C:
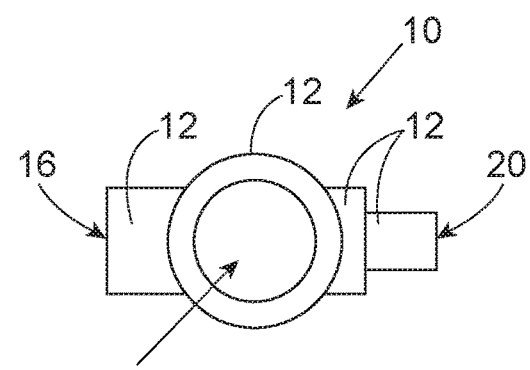
FIG. 1C is a left side view of the prior art eductor of FIG. 1A.
Figure 2A:
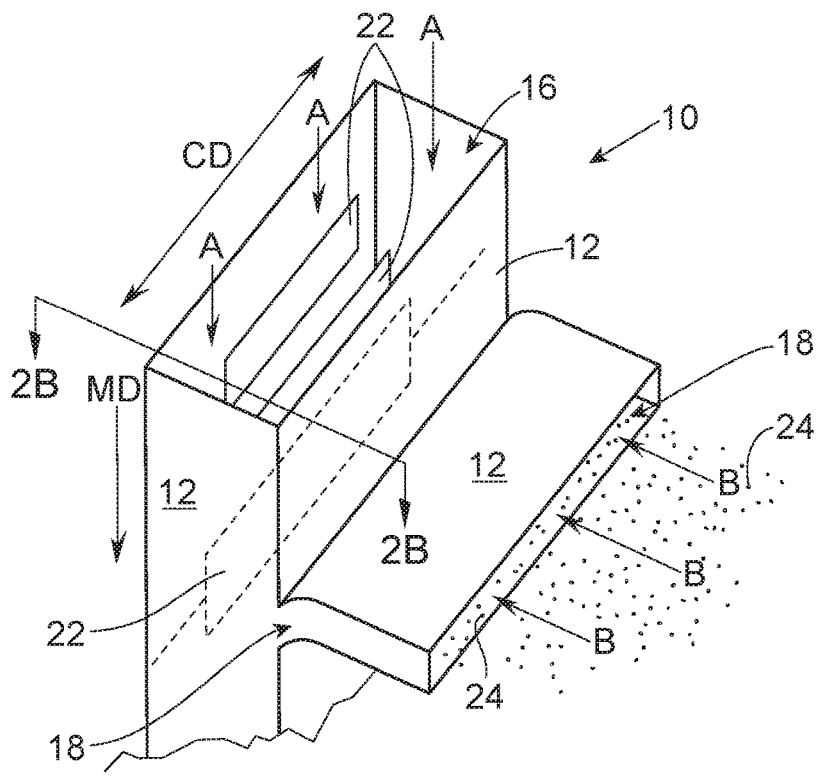
FIG. 2A is a perspective view of another example of a prior art eductor.
Figure 2B:
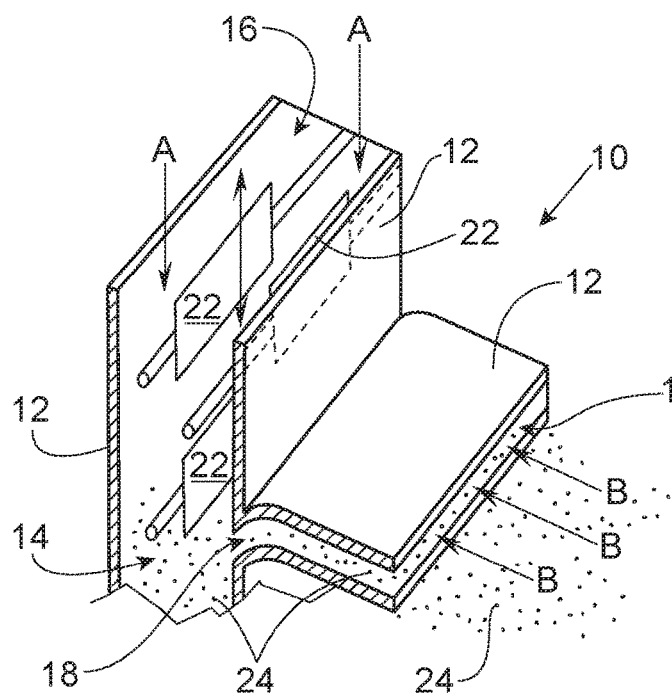
FIG. 2B is a cross-sectional view of the prior art eductor of FIG. 2A taken along line 2B-2B.
Figure 2C:
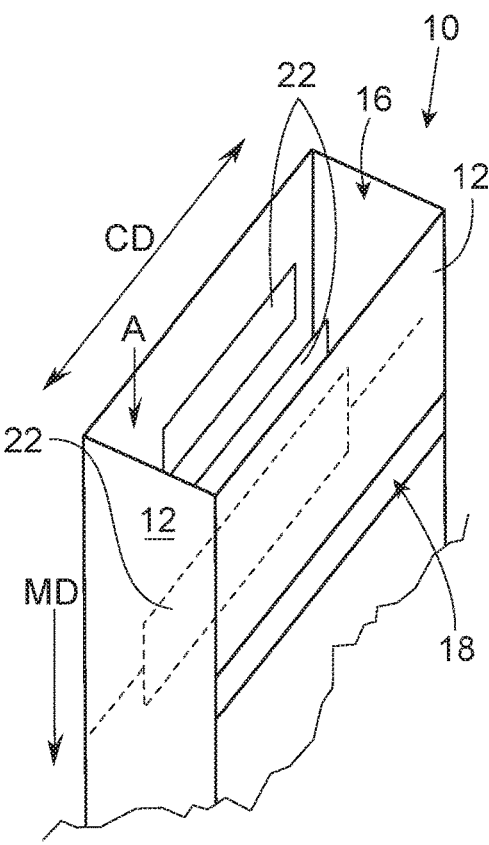
FIG. 2C is a perspective view of the prior art eductor of FIG. 2A with a portion of the housing broken away to show more clearly the invariable motive fluid inlet.
Figure 3A:
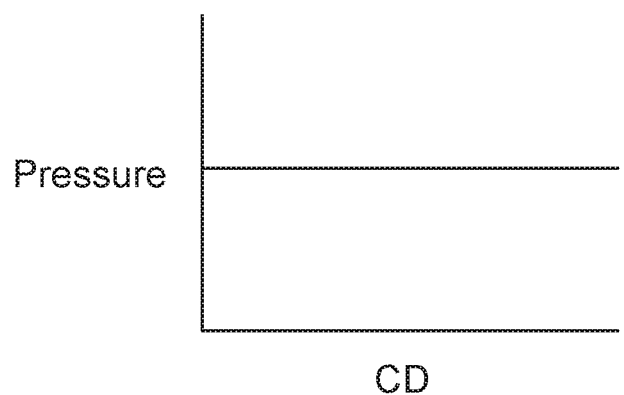
FIG. 3A is a schematic representation of an example of an invariable motive fluid's pressure CD profile.
Figure 3B:
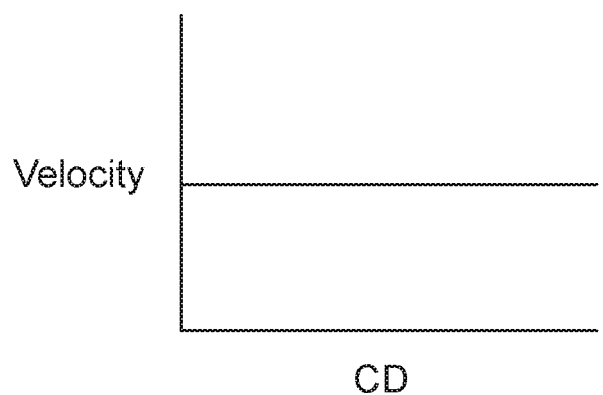
FIG. 3B is a schematic representation of an example of an invariable motive fluid's velocity CD profile.
Figure 3C:
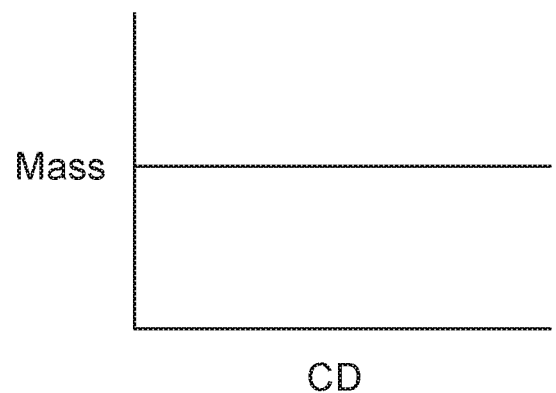
FIG. 3C is a schematic representation of an example of an invariable motive fluid's mass CD profile.
Figure 3D:
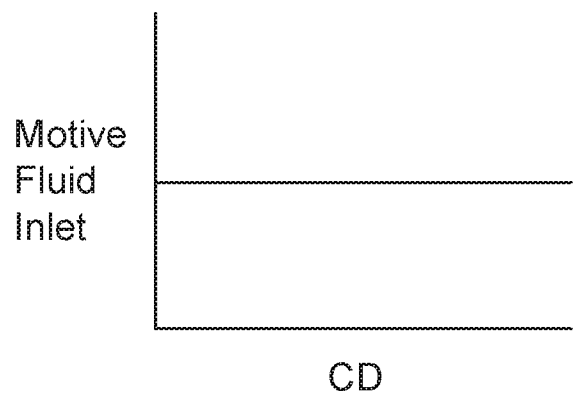
FIG. 3D is a schematic representation of an example of an invariable motive fluid inlet's CD profile.

"Eductor" as used herein means a device or equipment that combines two or more fluids; namely: 1) one or more entrained fluids, for example comprising a plurality of solid additives; and 2) one or more motive fluids (the driving force) that creates suction within the eductor to pull the one or more entrained fluids into itself to form a mixed fluid that then exits the eductor through the eductor's one or more fluid outlets.

"Spatially Controllable Eductor" as used herein means an eductor that is capable of controlling and/or controls during operation profiles of one or more fluids (entrained fluid, motive fluid, and/or mixed fluid) passing through the eductor. In one example, a spatially controllable eductor controls the profile of an entrained fluid and/or a mixed fluid during operation of the eductor. In still another example, a spatially controllable eductor controls the profile of an entrained fluid comprising solid additives, for example pulp fibers, and/or a mixed fluid comprising solid additives, for example pulp fibers, during operation of the eductor.

"CD Controllable Eductor" as used herein means a spatially controllable eductor that is capable of controlling and/or controls during operation CD profiles of one or more fluids (entrained fluid, motive fluid, and/or mixed fluid) passing through the eductor. In one example, a CD controllable eductor controls the CD profile of an entrained fluid and/or a mixed fluid during operation of the eductor. In still another example, a CD controllable eductor controls the CD profile of an entrained fluid comprising solid additives, for example pulp fibers, and/or a mixed fluid comprising solid additives, for example pulp fibers, during operation of the eductor.

"Fluid Mixing Chamber" is the point immediately after the entrance of the motive fluid into the eductor, where the motive and entrained fluids intermingle. This section of the eductor serves to even the velocity profile of the slower entrained fluid and the faster motive fluid. The mixing chamber is often, but not always, the smallest cross sectional area of the eductor through which both the entrained and motive air passes. The volume of the mixing chamber begins where the motive and entrained fluids combine and extends to the point at which the cross sectional area of the eductor begins to increase in the event that the mixing chamber has the minimum cross sectional area in the eductor through which both the entrained and motive fluids travel. In the event that the mixing chamber is the same or larger diameter than other areas of the eductor, the chamber extends to the point where the velocity profile in the plane perpendicular to the flow becomes invariant as that plane traverses along the direction of flow.

"MD and CD" as used herein can be described by first striking a plane normal to the direction of flow through the beginning of the mixing chamber of the eductor. The CD of the eductor refers to the larger axis of this plane, while the MD of the eductor refers to the smaller axis of this plane.

In one example, the fluid mixing chamber is the interior volume of the eductor defined the eductor's housing wherein one or more entrained fluids and one or more motive fluids contact each other and mix to create a mixed fluid (the result of an entrained fluid and motive fluid mixing together). In one example, the fluid mixing chamber comprises 1) an entrainment section wherein at least one entrained fluid and one motive fluid contact one another; and 2) a mixing section, which is a length of the fluid mixing chamber positioned between the entrainment section and the eductor's fluid outlet. In the mixing section, the entrained fluid including any solid additives, for example pulp fibers, and the motive fluid mix and any solid additives may be redistributed in the CD profile if the motive fluid is a variable motive fluid. In one example, the entrainment section exhibits a greater cross-sectional area than the mixing section. In another example, the fluid mixing chamber exhibits a tapering cross-sectional area from the entrained fluid inlet to the fluid outlet. In still another example, the eductor's housing comprises a diffuser section that flares outward from the minimal cross-sectional area of the fluid mixing chamber and/or mixing section of the fluid mixing chamber ending at the fluid outlet of the eductor. So in one example, the fluid outlet of the eductor exhibits a greater cross-sectional area than the mixing chamber and/or the mixing section of the mixing chamber. In another example, the fluid outlet exhibits a cross-sectional area that is the same as or greater than the minimal cross-sectional area of the mixing chamber and/or the mixing section of the mixing chamber.

In one example, one or more walls of the fluid mixing chamber may comprise one or more side fluid inlets, which may angled such that they direct their corresponding side fluid, such as compressed air, substantially parallel to the mixed fluid movement through the eductor to the fluid outlet of the eductor. The side fluid entering the mixing chamber through the one or more side fluid inlets may alleviate flow anomalies along the mixing chamber's sidewalls.

"Entrained Fluid" as used herein means a fluid that is pulled into an eductor's fluid mixing chamber through an eductor's entrained fluid inlet as a result of suction created within the eductor's fluid mixing chamber by a motive fluid entering the eductor's fluid mixing chamber. In one example, the entrained fluid comprises one or more solid additives, for example a plurality of fibers, such as pulp fibers. In one example, entrained air vacuum levels may be as high as 12" $H_2O$. In one example, the velocities may be up to 60 m/s at their fastest point. In another example, the velocities may be greater than 60 m/s at their fastest point.

"Entrained Fluid Inlet" as used herein means the opening within an eductor through which an entrained fluid enters a fluid mixing chamber of the eductor.

"Motive Fluid" as used herein means a fluid entering an eductor's fluid mixing chamber through one or more motive fluid inlets. The motive fluid exhibits a higher total pressure and/or velocity than an entrained fluid entering the same eductor.

"Invariable Motive Fluid" as used herein means a motive fluid that has constant, non-changing pressure, velocity, mass, and/or flow across the motive fluid's CD profile. In one example, the invariable motive fluid does not exhibit two or more different zones/regions within the motive fluid, especially across the motive fluid's CD profile. FIGS. 3A-3D schematically show an example of an invariable motive fluid that has constant, non-changing (invariable) pressure (FIG. 3A), constant, non-changing (invariable) velocity (FIG. 3B), constant, non-changing (invariable) mass (FIG. 3C), and constant non-changing (invariable) motive fluid inlet (FIG. 3D) across its CD profile. The constant, non-changing invariable motive fluid is incapable and/or fails to translate into and/or impart to a mixed fluid within a mixing chamber and/or eductor controllability and/or adjustability of the mixed fluid, for example across the mixed fluid's CD profile.

Figure 4A:
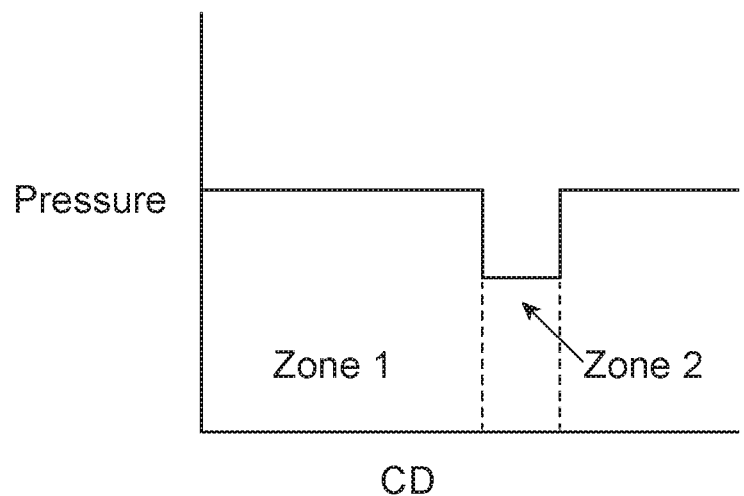
FIG. 4A is a schematic representation of an example of a variable motive fluid's pressure CD profile according to the present invention.
Figure 4B:
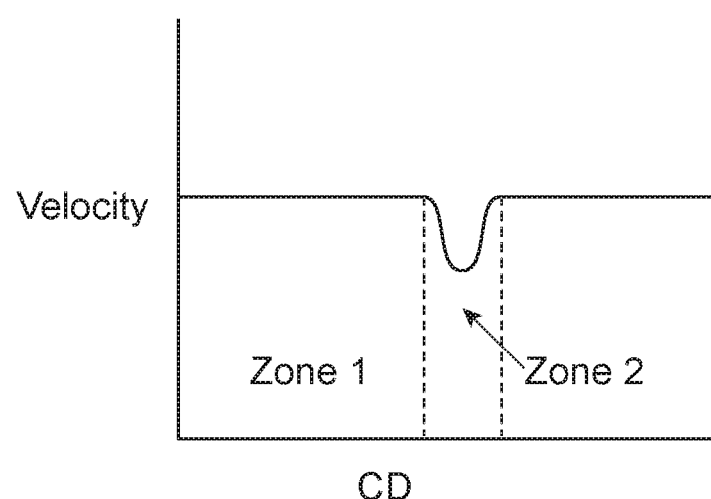
FIG. 4B is a schematic representation of an example of a variable motive fluid's velocity CD profile according to the present invention.
Figure 4C:
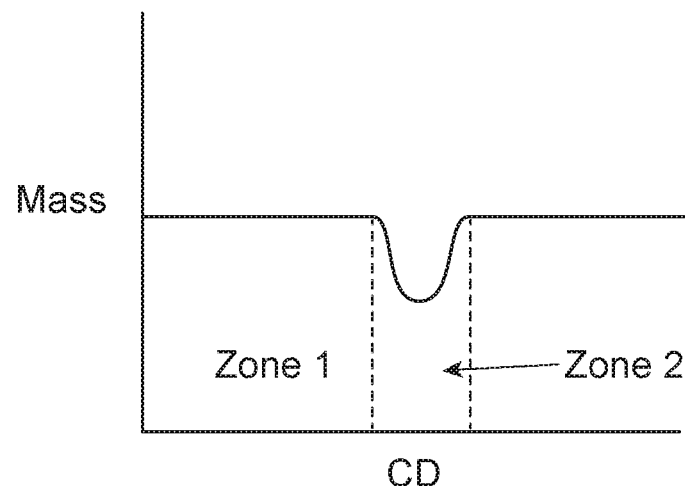
FIG. 4C is a schematic representation of an example of a variable motive fluid's mass CD profile according to the present invention.
Figure 4D:
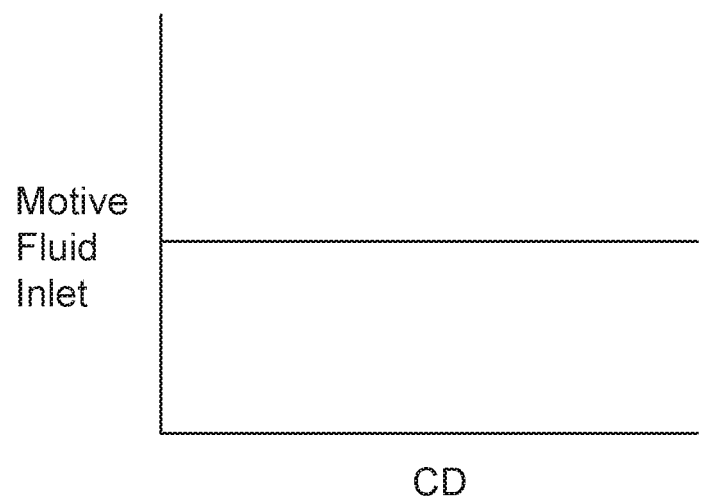
FIG. 4D is a schematic representation of an example of a invariable motive fluid inlet's CD profile.
Figure 5A:
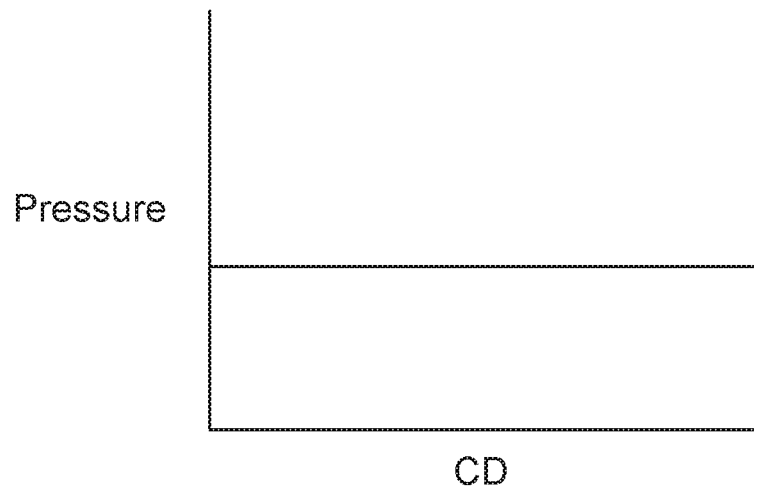
FIG. 5A is a schematic representation of an example of an invariable motive fluid's pressure CD profile.
Figure 5B:
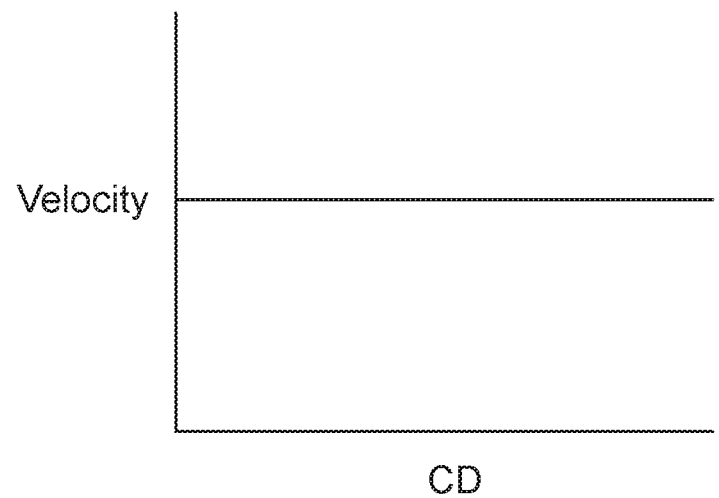
FIG. 5B is a schematic representation of an example of an invariable motive fluid's velocity CD profile.
Figure 5C:
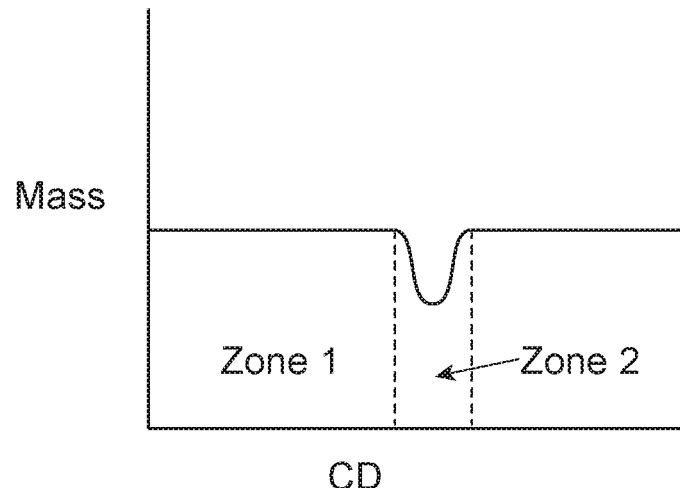
FIG. 5C is a schematic representation of an example of a variable motive fluid's mass CD profile according to the present invention.

"Variable Motive Fluid" as used herein means a motive fluid that has varying ("variable") motive fluid pressure, velocity, mass, and/or flow across the motive fluid's CD profile. FIGS. 4A-4D schematically show an example of a variable motive fluid that has varying (variable) pressure (FIG. 4A), varying (variable) velocity (FIG. 4B), and varying (variable) mass (FIG. 4C) by varying the pressure and thus the velocity through a constant, non-changing (invariable) motive fluid inlet (FIG. 4D), across its CD profile. FIGS. 5A-5D schematically show an example of a variable motive fluid that has a constant, non-changing (invariable) pressure (FIG. 5A), a constant, non-changing (invariable) velocity (FIG. 5B), and varying (variable) mass (FIG. 5C) by using constant, non-changing pressure and thus constant, non-changing velocity through a varying (variable) motive fluid inlet (FIG. 5D), across its CD profile. In one example, the variable motive fluid is void (less than 5% and/or less than 3% and/or less than 1% and/or less than 0.5% and/or less than 0.1% and/or 0% by weight) of solid additives, for example fibers, such as pulp fibers. In one example, the eductors of the present invention may be run up to about 200IWG in the motive fluid streams, and velocities of up to about 0.7 mach and with properly designed de Laval nozzles the eductors of the present invention may be capable of supersonic flow if desired. In one example of a variable motive fluid as shown in FIGS. 4A and 4B, the variable motive fluid comprises at least one zone/region (Zone 1) that differs in one or more properties, for example pressure, velocity, mass, and/or flow, from at least one other zone/region (Zone 2) within the motive fluid, especially across the motive fluid's CD profile. In another example of a variable motive fluid as shown in FIG. 5C, the variable motive fluid comprises at least one zone/region (Zone 1) that differs in one or more properties, for example mass and/or flow, by using a variable motive fluid inlet (FIG. 5D) (comprising at least one zone/region (Zone 3) that differs in area from at least one other zone/region (Zone 4) across the motive fluid inlet's CD), from at least one other zone/region (Zone 2) within the motive fluid, especially across the motive fluid's CD profile. The variable motive fluid translates into and/or imparts to the mixed fluid within the mixing chamber and/or eductor of the present invention controllability and/or adjustability of the mixed fluid, for example across the mixed fluid's CD profile.

"Motive Fluid Inlet" as used herein means an opening within an eductor through which a motive fluid enters a fluid mixing chamber of the eductor.

"Invariable Motive Fluid Inlet" as used herein means a motive fluid inlet within an eductor from which an invariable motive fluid enters the eductor's fluid mixing chamber. In one example, an invariable motive fluid inlet is not capable of creating a variable motive fluid. In one example, an invariable motive fluid inlet comprises a continuous and/or non-segmented and/or non-variable dimension slot or opening through which a motive fluid enters an eductor's fluid mixing chamber. FIG. 4D schematically shows an example of a constant, non-changing (invariable) motive fluid inlet, for example the invariable motive fluid inlet exhibits a constant non-changing area, across its CD profile.

Figure 5D:
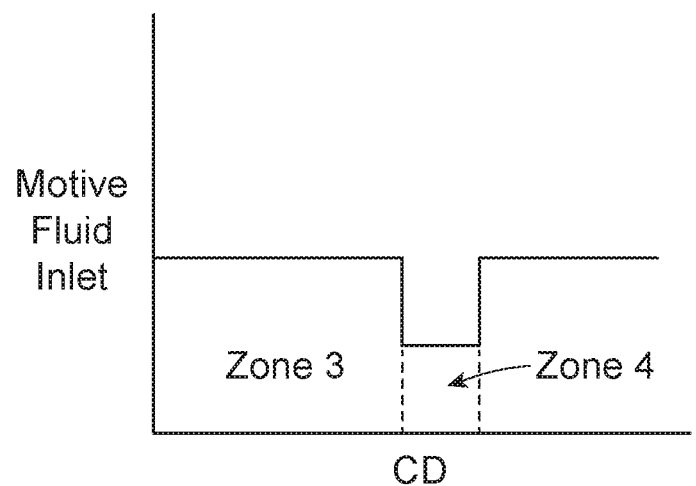
FIG. 5D is a schematic representation of an example of a variable motive fluid inlet's CD profile according to the present invention.

"Variable Motive Fluid Inlet" as used herein means a motive fluid inlet within an eductor wherein the motive fluid inlet creates a variable motive fluid as a motive fluid enters the eductor's fluid mixing chamber through the variable motive fluid inlet. In one example, the variable motive fluid inlet is a segmented (two or more and/or three or more and/or four or more and/or five or more zones) motive fluid inlet through which two or more and/or a corresponding number (the same number as the total number of zones) of motive fluids from corresponding motive fluid delivery devices, such as air nozzles that are independently controllable, such as via valves, for example with respect to their pressures, enters the eductor's fluid mixing chamber such that the motive fluid contacting the entrained fluid within the fluid mixing chamber is a variable motive fluid. The motive fluid delivery devices may be sourced from a single motive fluid source, such as an air tank, or may be sourced from individual motive fluid sources, such as air tanks, that are associated with a respective motive fluid delivery device. FIG. 5D schematically shows an example of a varying (variable) motive fluid inlet, for example the variable motive fluid inlet exhibits a varying (variable) area such that the variable motive fluid inlet comprises at least one zone/region (Zone 3) that differs in area from at least one other zone/region (Zone 4) across its CD profile.

In another example, the variable motive fluid inlet is a segmented motive fluid inlet through which one motive fluid from a single motive fluid delivery device, for example compressed air nozzle, is divided into different zones before the motive fluid enters the eductor's fluid mixing chamber such that the motive fluid passing through one zone of the variable motive fluid inlet exhibits different properties, for example a different pressure than the motive fluid passing through a different zone, for example across the motive fluid's CD profile, such that the motive fluid contacting the entrained fluid within the fluid mixing chamber is a variable motive fluid. The motive fluid delivery device may be sourced from a single motive fluid source, such as an air tank, or from multiple motive fluid sources, such as air tanks.

In yet another example, the variable motive fluid inlet is a continuous, non-segmented motive fluid inlet through which a motive fluid originating from a single motive fluid source, such as an air tank, and created by multiple motive fluid delivery devices, such as air nozzles that are independently controllable, for example with respect to their pressures, enters the eductor's fluid mixing chamber such that the motive fluid contacting the entrained fluid within the fluid mixing chamber is a variable motive fluid.

In another example, the variable motive fluid inlet is a continuous, non-segmented motive fluid inlet through which a motive fluid sourced from multiple motive fluid sources, such as air tanks, and created by multiple motive fluid devices, such as air nozzles that are independently controllable, for example with respect to their pressures, enters the eductor's fluid mixing chamber such that the motive fluid contacting the entrained fluid within the fluid mixing chamber is a variable motive fluid.

In still another example, the variable motive fluid inlet is a continuous, non-segmented, dynamic motive fluid inlet through which a motive fluid created by a single motive fluid source enters the eductor's fluid mixing chamber such that the motive fluid contacting the entrained fluid within the fluid mixing chamber is a variable motive fluid.

In even yet another example, the variable motive fluid inlet comprises a two or more motive fluid delivery devices, such as air nozzles, for example a plurality of motive fluid delivery devices in a series that abut the housing of the fluid mixing chamber, that are independently controllable, for example with respect to the respective motive fluids' pressures exiting each motive fluid delivery device, that provide individual motive fluids to the fluid mixing chamber of an eductor such that the motive fluid contacting the entrained fluid within the fluid mixing chamber is a variable motive fluid.

In one example, the variable motive fluid may originate as two or more discrete, separate motive fluids that exit a variable motive fluid inlet such that a variable motive fluid is created and/or provided to the fluid mixing chamber of the eductor. The two more discrete, separate motive fluids may each originate from different motive fluid sources, such as air tanks, or may originate from the same motive fluid source, but be delivered to the variable motive fluid inlet by different motive fluid delivery devices, such as motive fluid nozzles, for example compressed air nozzles. Other examples of motive fluid sources for air are multi-stage blowers, centrifugal fans, air compressors. Liquid motive fluid sources such as pumps or pressurized headers can also be used.

Figure 6:
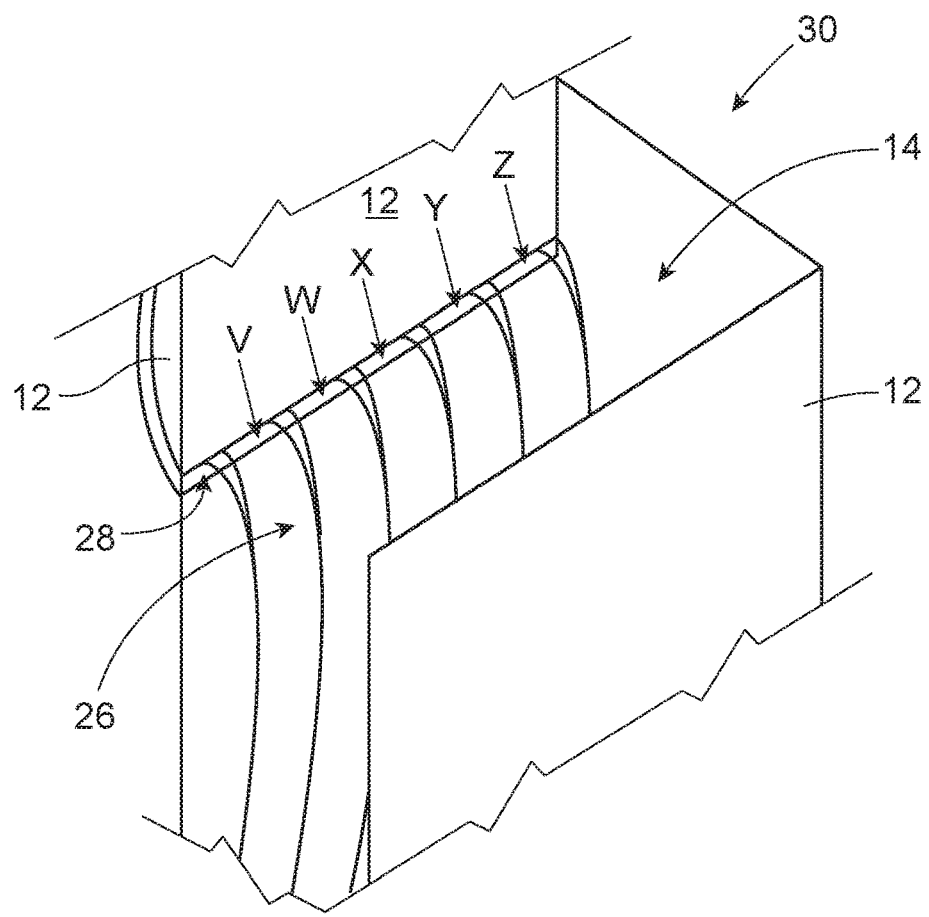
FIG. 6 is a partially opened, schematic representation of a portion of an example of a spatially controllable, for example CD controllable, eductor according to the present invention.
Figure 7A:
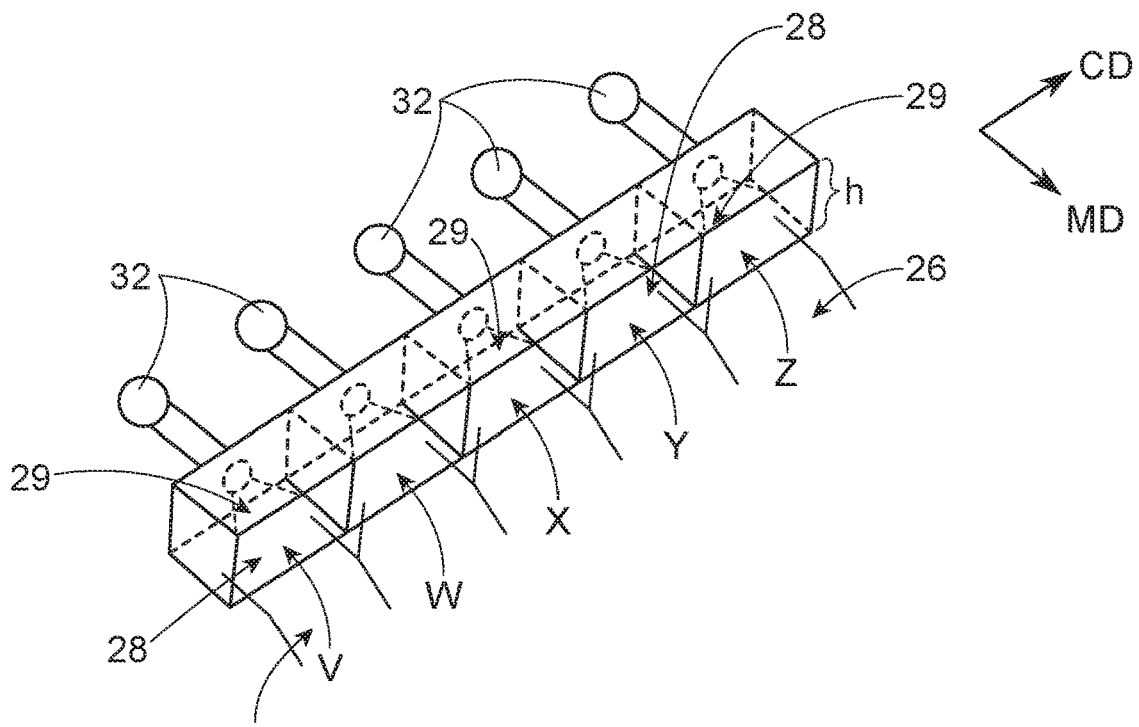
FIG. 7A is a schematic representation of an example of a variable motive fluid inlet according to the present invention.

An example of a variable motive fluid inlet and variable motive fluid are shown in FIG. 6. FIG. 6 shows an example of a spatially controllable, for example CD controllable, eductor 30 in accordance with the present invention during operation. As shown in FIG. 6, a variable motive fluid 26 enters the eductor's fluid mixing chamber 14 defined by housing 12 through a variable motive fluid inlet 28. In this example, as shown in FIGS. 6 and 7A, the variable motive fluid inlet 28 is segmented into two or more and/or three or more and/or four or more and/or five or more zones, in one example 16 or more zones, represented as zones V, W, X, Y, and Z) through which two or more and/or a corresponding number (the same number as the total number of zones) of motive fluids 29 enter the eductor's fluid mixing chamber 14. The motive fluids 29 are supplied from corresponding motive fluid delivery devices 32, such as air nozzles that are independently controllable, for example with respect to their pressures. The motive fluids 29 pass through the zones V, W, X, Y, and Z, and enter the eductor's fluid mixing chamber 14 such that a variable motive fluid 26 is formed. The variable motive fluid 26 contacts an entrained fluid (not shown) within the fluid mixing chamber 14. As shown in FIG. 7A, the variable motive fluid 26 originates from discrete, separate motive fluids 29 sourced from discrete, separate motive fluid delivery devices 32, such as air nozzles, which are in fluid communication with the variable motive fluid inlet 28.

The motive fluid delivery devices 32 of the present invention may be supplied by a single motive fluid source 33 (shown in FIG. 7D), such as a single air tank, or multiple motive fluid sources 33, such as a plurality of single motive fluid sources 33 each supplying a single motive fluid delivery device 32.

The motive fluid delivery devices 32 supply motive fluids 29 to the variable motive fluid inlet 28. The variable motive fluid inlet 28 is segmented into five zones, in this case, zones V, W, X, Y, or Z, such that a single motive fluid delivery device 32 is in fluid communication with a single zone, for example V, W, X, Y, or Z of the variable motive fluid inlet 28. The discrete, separate motive fluid delivery devices 32 are independently controllable such that the pressure associated with a motive fluid 29 supplied from one motive fluid delivery device 32 can be different from the pressure of a motive fluid 29 supplied from a different motive fluid delivery device 32. In order for the variable motive fluid 26 to be created, different zones/regions of motive fluid 29, especially in the CD profile of the resulting variable motive fluid 26, must be created before exiting the variable motive fluid inlet 28.

In one example, the dimensions, for example the height (represented as "h") and/or complete cross-section dimensions of the zones V, W, X, Y, and/or Z may be the same or may be independently varied to influence the motive fluid 29 exiting the variable motive fluid inlet 28 and thus resulting in the creation of the variable motive fluid 26.

Figure 7B:
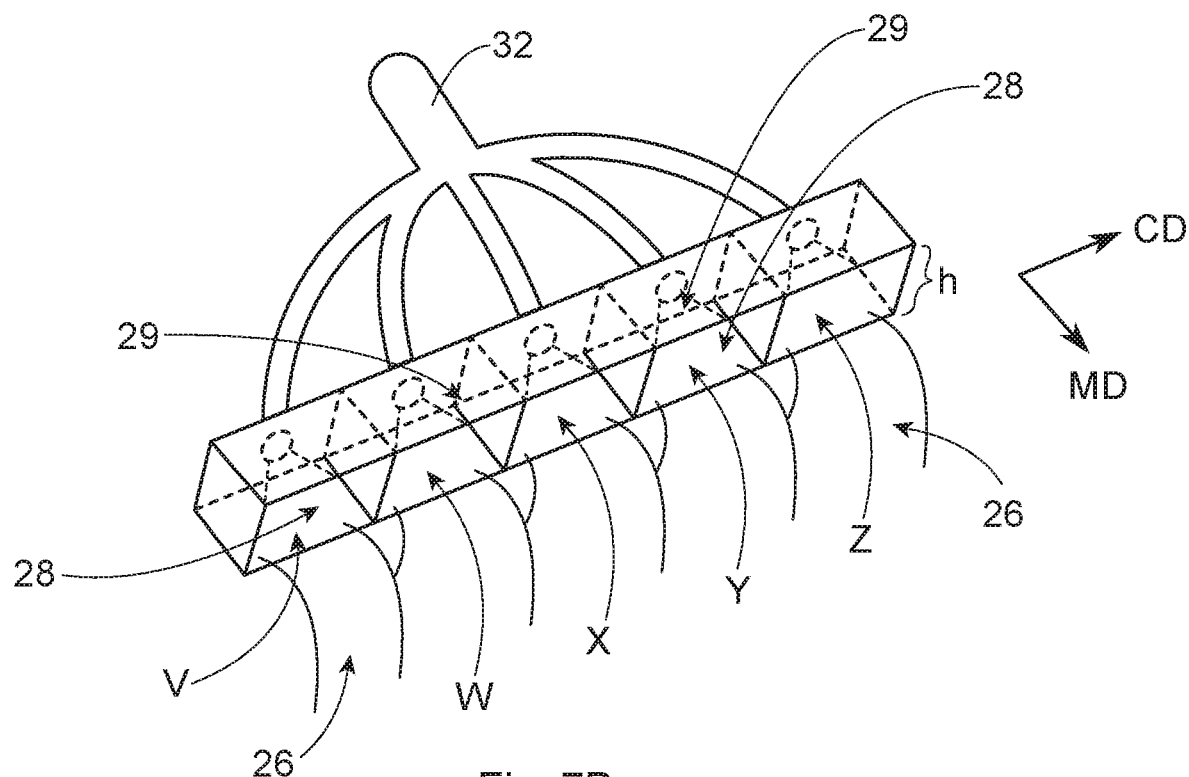
FIG. 7B is a schematic representation of another example of a variable motive fluid inlet according to the present invention.

In another example, as shown in FIG. 7B, the variable motive fluid 26 originates from a single motive fluid 29 sourced from a single motive fluid source 32, such as an air compressor nozzle, which is in fluid communication with the variable motive fluid inlet 28. The single motive fluid source 32 supplies a single motive fluid 29 to the variable motive fluid inlet 28. The variable motive fluid inlet 28 is segmented into five zones, in this case, zones V, W, X, Y, or Z, such that the single motive fluid source 32 is in fluid communication with each of the zones, for example V, W, X, Y, or Z of the variable motive fluid inlet 28. In order for the variable motive fluid 26 to be created, different zones/regions of motive fluid 29, especially in the CD profile of the resulting variable motive fluid 26, must be created before exiting the variable motive fluid inlet 28. In this example, the dimensions, for example the height (represented as "h") and/or complete cross-section dimensions of the zones V, W, X, Y, and/or Z are independently varied to influence the motive fluid 29 exiting the variable motive fluid inlet 28 such that the pressures of the motive fluid 29 exiting two or more of the zones V, W, X, Y, and/or Z are different, thus resulting in the creation of the variable motive fluid 26.

Figure 7C:
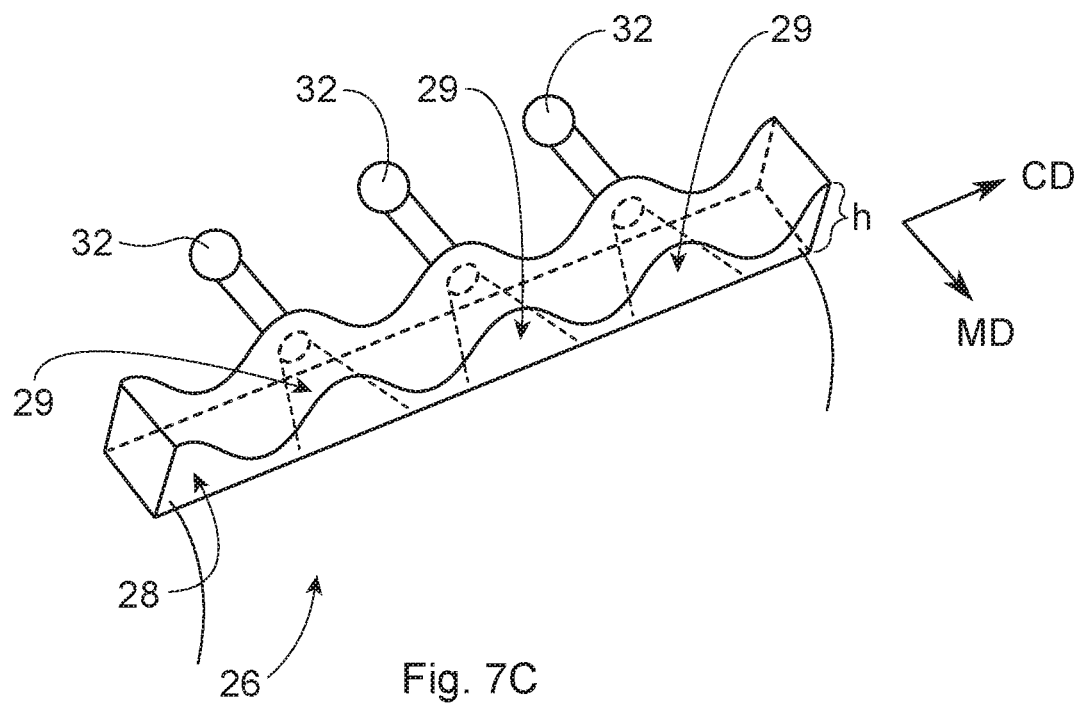
FIG. 7C is a schematic representation of another example of a variable motive fluid inlet according to the present invention.

In still another example as shown in FIG. 7C, the variable motive fluid 26 originates from discrete, separate motive fluids 29 sourced from discrete, separate motive fluid delivery devices 32, such as air nozzles, which are in fluid communication with the variable motive fluid inlet 28. The motive fluid delivery devices 32 supply motive fluids 29 to the variable motive fluid inlet 28. Even though the variable motive fluid inlet 28 of FIG. 7C is not segmented into zones, like FIGS. 7A and 7B, the variable motive fluid inlet 28 shown in FIG. 7C is selectively deformable (for example such that the variable motive fluid inlet comprises two or more different zones/regions that differ in area from one another) such that the at least two of the motive fluids 29 exhibit different pressures as they enter the fluid mixing chamber 14 of FIG. 6, for example. This selectively deformable characteristic of the variable motive fluid inlet 28 may be temporary or permanent. In this example, the dimensions, for example the height (represented as "h") and/or complete cross-section dimension of the variable motive fluid inlet 28 may be varied across its CD to influence the motive fluids 29 exiting the variable motive fluid inlet 28 such that the pressures across the motive fluids' 29 CD profile are non-uniform and/or varied such that the variable motive fluid 26 is created. Also, the discrete, separate motive fluid delivery devices 32 of FIG. 7C may be independently controllable such that the pressure associated with a motive fluid 29 supplied from one motive fluid source 32 can be different from the pressure of a motive fluid 29 supplied from a different motive fluid source 32. In order for the variable motive fluid 26 to be created, different zones/regions of motive fluid 29, especially in the CD profile of the resulting variable motive fluid 26, must be created before exiting the variable motive fluid inlet 28.

Figure 7D:
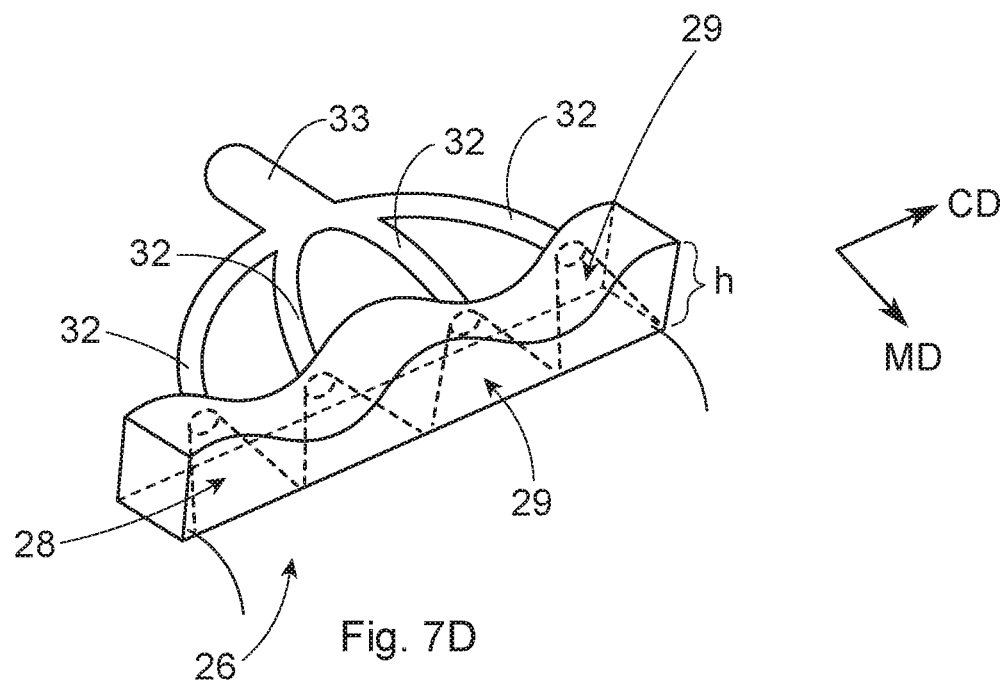
FIG. 7D is a schematic representation of another example of a variable motive fluid inlet according to the present invention.

In even another example as shown in FIG. 7D, the variable motive fluid 26 originates from a single motive fluid 29 sourced from a single motive fluid source 32, such as an air compressor nozzle, which is in fluid communication with the variable motive fluid inlet 28. The single motive fluid source 32 supplies a single motive fluid 29 to the variable motive fluid inlet 28. Even though the variable motive fluid inlet 28 of FIG. 7D is not segmented into zones, like FIGS. 7A and 7B, the variable motive fluid inlet 28 shown in FIG. 7D is selectively deformable (for example such that the variable motive fluid inlet comprises two or more different zones/regions that differ in area from one another) such that the motive fluid 29 exhibits different pressures across its CD profile as it enters the fluid mixing chamber 14, of FIG. 6, for example. This selectively deformable characteristic of the variable motive fluid inlet 28 may be temporary or permanent. In this example, the dimensions, for example the height (represented as "h") and/or complete cross-section dimension of the variable motive fluid inlet 28 may be varied across its CD to influence the motive fluid 29 exiting the variable motive fluid inlet 28 such that the pressures across the motive fluid's 29 CD profile are non-uniform and/or varied such the variable motive fluid 26 is created.

Figure 7E:
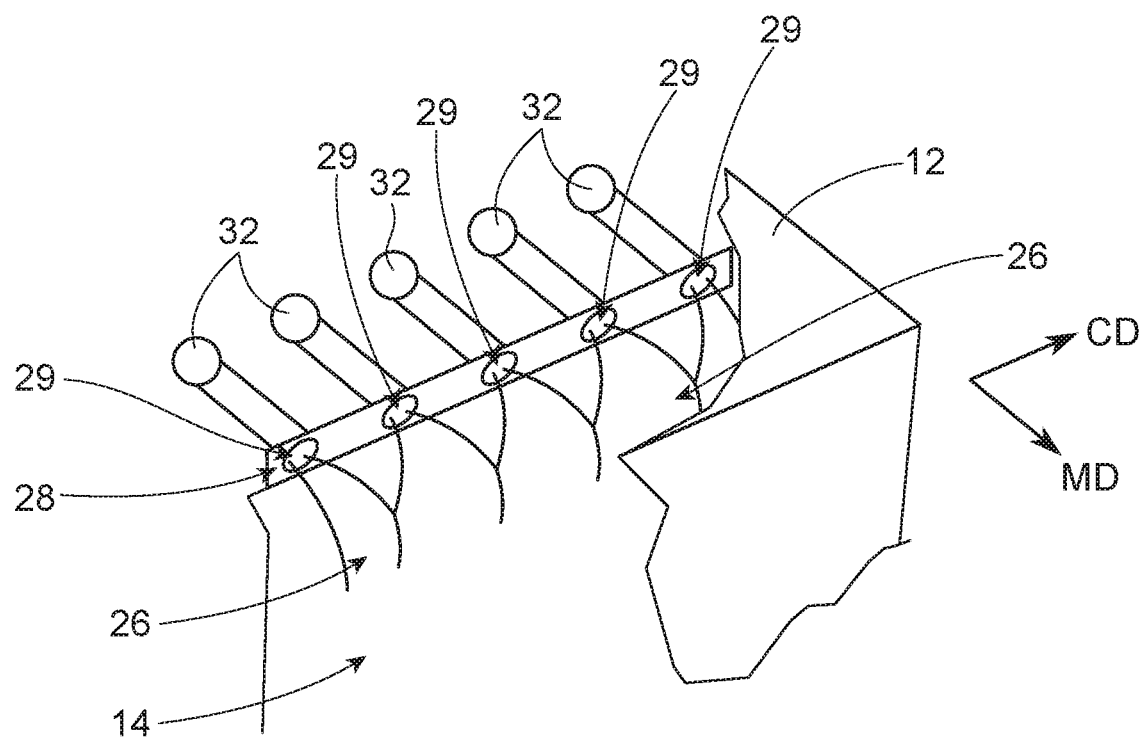
FIG. 7E is a schematic representation of another example of a variable motive fluid inlet according to the present invention.

In even still yet another example as shown in FIG. 7E, the variable motive fluid 26 originates from discrete, separate motive fluids 29 sourced from discrete, separate motive fluid delivery devices 32, such as air nozzles, which are in fluid communication with the variable motive fluid inlet 28. The motive fluid delivery devices 32 supply motive fluids 29 to the variable motive fluid inlet 28. The variable motive fluid inlet 28 comprises two or more, and/or a plurality of discrete, separate motive fluid delivery devices 32, such as in a series, that supply motive fluids 29 into the fluid mixing chamber 14 defined by housing 12 of the spatially controllable, for example CD controllable, eductor. The discrete, separate motive fluid delivery devices 32 of FIG. 7E may be independently controllable such that the pressure associated with a motive fluid 29 supplied from one motive fluid source 32 can be different from the pressure of a motive fluid 29 supplied from a different motive fluid source 32. The variable motive fluid 26 is created as a result of two or more of the motive fluids 29 exhibiting different pressures upon entering the fluid mixing chamber 14.

"Fluid Outlet" as used herein means the opening within the housing and/or mixing chamber and/or diffuser and/or eductor through which a fluid, for example mixed fluid, exits. In one example, the fluid outlet is an opening at the end of the mixing chamber, if no diffuser is present, from which the mixed fluid exits. In another example, the fluid outlet is an opening at the end of the diffuser that is in fluid communication with the mixing chamber on one end and the fluid outlet on the other end through which the mixed fluid exits.

"Diffuser" as used herein means a duct of expanding cross-sectional area that transforms a high velocity, low static pressure flow into a lower velocity, higher static pressure flow.

In one example, a mixing chamber of the present invention of minimum cross-sectional area has a fluid outlet that begins at the end of the diffuser, such as the discharge diffuser.

"Nozzle" as used herein means a duct of decreasing cross-sectional area that transforms a low velocity, high static pressure flow into a higher velocity, lower static pressure flow.

In one example, an eductor of the present invention that has a mixing chamber area that is smaller than the distance between two motive fluid inlets, for example two motive air sources, a nozzle can be used to accelerate the flow into the mixing chamber.

In another example, in systems of solid delivery according to the present invention, nozzles can converge in the MD and diverge in the CD to accelerate and increase in CD width the flow exiting from the solid particle source.

"Forming Box Housing" as used herein means an enclosed or partially-enclosed volume formed by one or more walls through which one or more materials pass.

"Forming box" as used herein means a portion of a housing's volume within which commingling of two or more separate materials occurs. In one example, the forming box is a portion of the housing within which one or more and/or two or more first materials, for example filaments, such as polymer filaments, are commingled with one or more and/or two or more second materials, for example solid additives, such as fibers, for example pulp fibers. The forming box comprises two or more inlets for receiving two or more separate materials to be commingled. In one example, the forming box further comprises at least one outlet for evacuating the mixture of materials from the forming box. In one example, the forming box's at least one outlet opens to a collection device, for example a fabric and/or belt, such as a patterned belt, for receiving the mixture of materials, for example filaments and fibers, resulting in a fibrous structure. The receipt by the collection device of the mixture of materials may be aided by a vacuum box. The forming box may be a stand alone, separate, discrete, modular device that can be inserted into a machine, such as a fibrous structure making machine, and/or it may be a fully integrated component of a larger machine, such as a fibrous structure making machine so long as at least one first material and at least one second material, are capable of entering the forming box and commingling with one another according to the present invention.

"First material" as used herein means a material that is separate from at least one other material, for example a second material. In one example, the first material comprises filaments, such as polymer filaments.

"Second material" as used herein means a material that is separate from the first material. In one example, the second material comprises solid additives, such as fibers, for example pulp fibers.

"Stream(s) of solid additives" as used herein means a plurality of solid additives, for example a plurality of fibers, that are moving generally in the same direction. In one example, a stream of solid additives is a plurality of solid additives that enter a forming box of the present invention through the same solid additive inlet at the same time or substantially the same time.

"Stream(s) of filaments" as used herein means a plurality of filaments that are moving generally in the same direction. In one example, a stream of filaments is a plurality of filaments that enter a forming box of the present invention through the same filament inlet at the same time or substantially the same time. In one example, the stream of filaments may be a stream of meltblown filaments and/or a stream of spunbond filaments.

"Stream(s) of fibers" as used herein means a plurality of fibers that are moving generally in the same direction. In one example, a stream of fibers is a plurality of fibers that enter a forming box of the present invention through the same fiber inlet at the same time or substantially the same time. In one example, the stream of fibers may be a stream of pulp fibers.

"Filament inlet" as used herein means an entrance to the forming box through which one or more filaments enter.

"Solid additive inlet" as used herein means an entrance to the forming box through which one or more solid additives enter. A "fiber inlet" is an example of a solid additive inlet wherein the fiber inlet means an entrance to the forming box through which one or more fibers enter.

"Fibrous structure" as used herein means a structure that comprises one or more filaments and/or one or more fibers, which are considered solid additives for the present invention. In one example, a fibrous structure according to the present invention means an orderly arrangement of filaments and solid additives within a structure in order to perform a function. Non-limiting examples of fibrous structures of the present invention include paper, fabrics (including woven, knitted, and non-woven), and absorbent pads (for example for diapers or feminine hygiene products).

Spatially Controllable Eductor

Figure 8A:
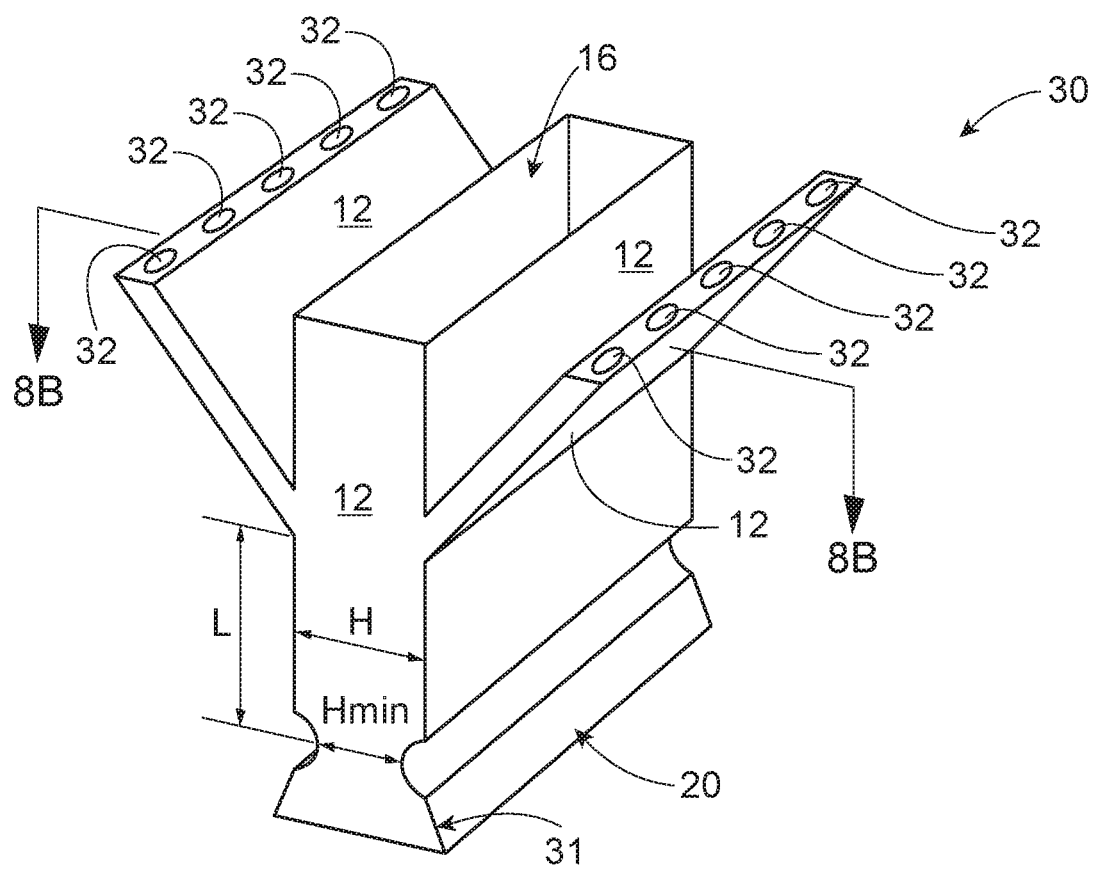
FIG. 8A is a perspective view of an example of a spatially controllable, for example CD controllable, eductor according to the present invention.
Figure 8B:
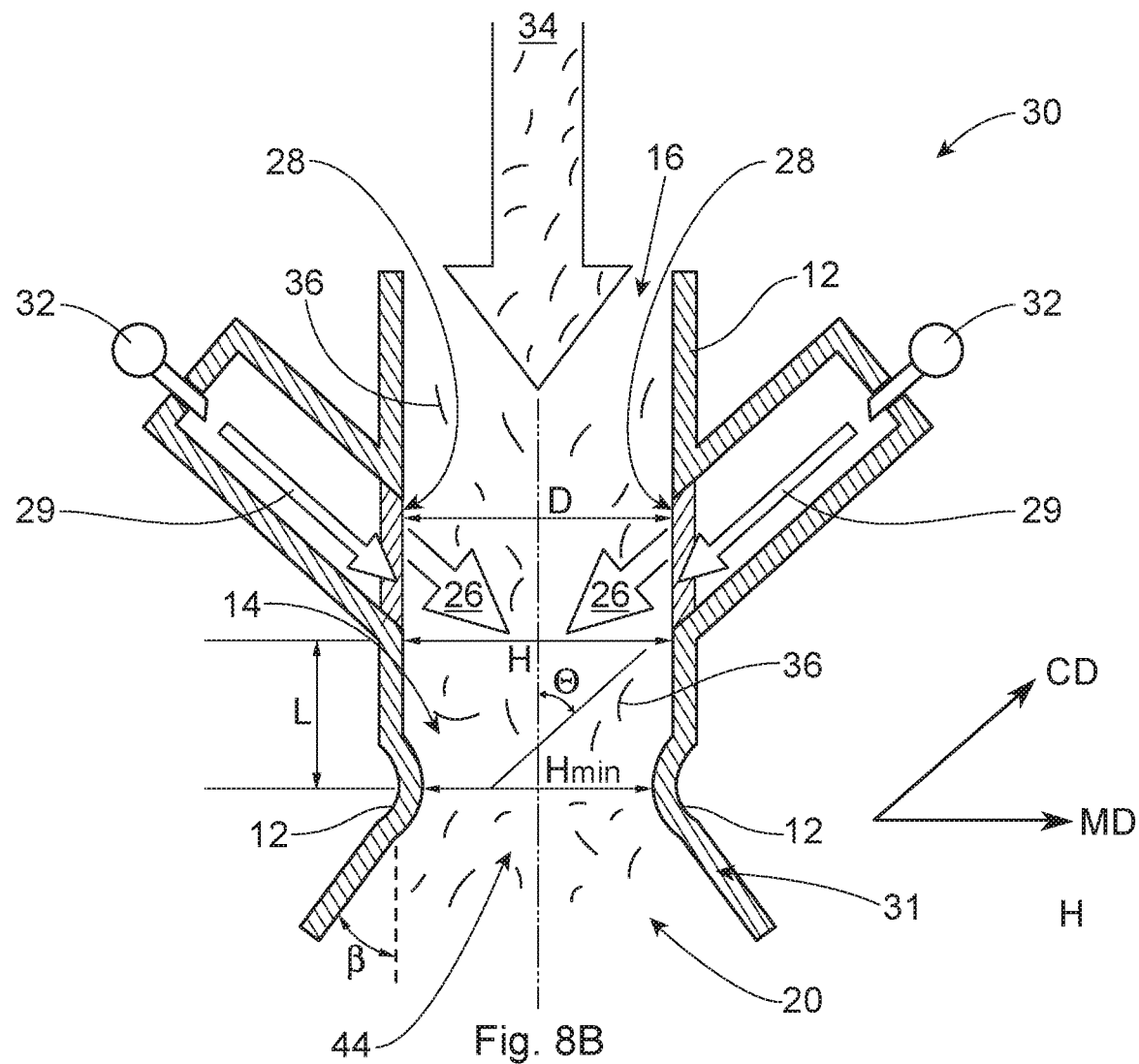
FIG. 8B is a cross-sectional view of the spatially controllable, for example CD controllable, eductor of FIG. 8A taken along line 8B-8B.

As shown in FIGS. 8A and 8B, a non-limiting example of a spatially controllable, for example CD controllable, eductor 30 according to the present invention comprises a housing 12 that defines one or more entrained fluid inlets, in this case one entrained fluid inlet 16, one or more variable motive fluid inlets, in this case two variable motive fluid inlets 28, and one or more fluid outlets, in this case one fluid outlet 20. The housing 12 further defines a fluid mixing chamber 14 that is in fluid communication with the fluid inlets 16, 28 and fluid outlet 20. Even though the following description is related to a spatially controllable, for example CD controllable, eductor 30 that comprises two or more variable motive fluid inlets 28, the relevant description also pertains to a spatially controllable, for example CD controllable, eductor that comprises only a single variable motive fluid inlet.

As shown in FIGS. 8A and 8B, the variable motive fluid inlets 28 may further comprise one or more, in this case five motive fluid delivery devices 32 that provide one or more motive fluids 29 to the variable motive fluid inlets 28. Even though the following description relates to the variable motive fluid inlets 28 shown in FIGS. 8A and 8B, the variable motive fluid inlets 28 may comprise one or more of the variable motive fluid inlets 28 described in FIGS. 7A-7E. The variable motive fluid inlets 28 may be the same or different.

The fluid outlet 20 of the spatially controllable, for example CD controllable, eductor 30 may comprise a diffuser 31. The diffuser 31 may exhibit an exit diffuser angle β, which is the angle formed by the wall of the diffuser and the wall of the fluid mixing chamber, of greater than 0° to less than 90° and/or greater than 0° to less than about 45° and/or greater than about 5° to less than about 30°. The housing 12 of the diffuser 31 may exhibit an arc.

The variable motive fluid inlets 28 may be positioned a distance D of greater than 0 to less than about 100 mm and/or greater than 0 to less than about 75 mm and/or from greater than 0 to less than about 50 mm and/or greater than 10 to less than about 50 mm from one another on opposing faces of the fluid mixing chamber 14.

At least one of the variable motive fluid inlets 28 exhibits a variable motive fluid inlet angle θ, which is the angle formed by the variable motive fluid inlet 28 and the entrained fluid 34, is greater than 0° to less than 90° and/or greater than 0 to less than 75° and/or greater than about 5° to less than about 45° and/or greater than about 5° to less than about 30° and/or greater than about 5° to less than about 20°.

The fluid mixing chamber 14 exhibits a maximum height H, which is the maximum distance between opposing faces of the fluid mixing chamber 14 parallel to the MD, of greater than 0 to less than about 100 mm and/or greater than about 0 to less than about 75 mm and/or from greater than 0 to less than about 50 mm and/or greater than 10 to less than about 50 mm.

In one example, the fluid mixing chamber 14 exhibits a minimum height $H_{min}$, which is the minimum distance between opposing faces of the fluid mixing chamber 14 parallel to the MD, of greater than 0 to less than about 100 mm and/or greater than about 0 to less than about 75 mm and/or from greater than 0 to less than about 50 mm and/or greater than 10 to less than about 30 mm.

The fluid mixing chamber 14 exhibits a length L, which is the distance between the variable motive fluid inlet 28 and the diffuser 31, if one exists, or the fluid outlet 20, if no diffuser 31 is present in the spatially controllable eductor 30, of greater than 0 to less than about 200 mm and/or greater than about 25 to less than about 150 and/or greater than about 50 to less than about 120 mm and/or greater than about 75 mm to less than about 120 mm.

Figure 8C:
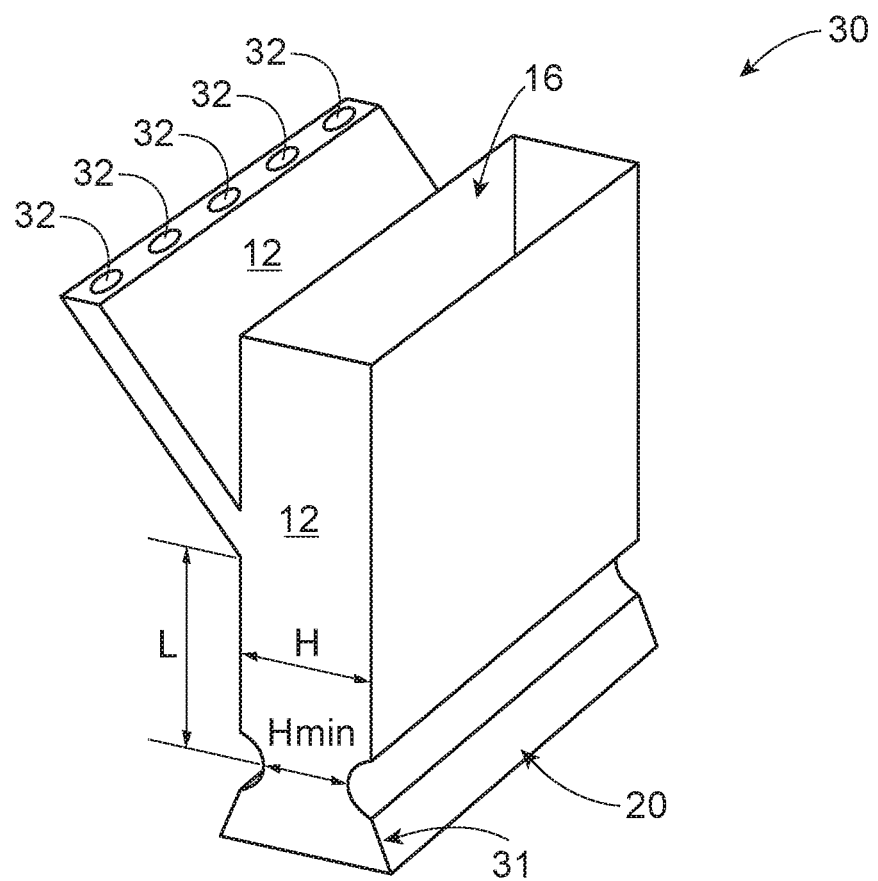
FIG. 8C is a perspective view of another example of the spatially controllable, for example CD controllable, eductor according to the present invention illustrating a single-sided variable motive fluid inlet.

As shown in FIG. 8C, the spatially controllable, for example CD controllable, eductor 30 may comprise a single motive fluid inlet (single-sided motive fluid inlet) sourced from one or more motive fluid delivery devices 32 rather than two motive fluid inlets (dual-sided motive fluid inlets) as shown in FIGS. 8A and 8B.

In one example, a CD controllable eductor of the present invention comprises one or more motive fluid inlets such that at least one of the motive fluid inlets produces a variable motive fluid during operation of the CD controllable eductor. In one example, at least of the motive fluid inlets is a variable motive fluid inlet. In another example, the CD controllable eductor comprises two or more variable motive fluid inlets.

The variable motive fluid inlet may comprise two or more zones (segments). At least one of the zones may be independently controllable from another of the zones. In one example, at least one of the zones is independently controllable with respect to its dimensions, for example such that the zones' area is adjustable and/or controllable.

In one example, at least one of the motive fluid inlets of the CD controllable eductor of the present invention is in fluid communication with one or more and/or two or more motive fluid delivery devices. In one example, at least one of the motive fluid delivery devices comprises an air nozzle. In another example, at least one of the motive fluid delivery devices is independently controllable from another of the motive fluid delivery devices, for example such that one motive fluid device may supply a motive fluid having a different pressure and/or velocity than a motive fluid supplied from another motive fluid delivery device.

In one example, the CD controllable eductor may comprise one or more and/or two or more entrained fluid inlets. Further, the CD controllable eductor may comprise a fluid mixing chamber in fluid communication with at least one of the entrained fluid inlets and at least one of the motive fluid inlets of the eductor. Further yet, the CD controllable eductor may comprise one or more and/or two or more fluid outlets, for example that are in fluid communication with the fluid mixing chamber.

The fluid mixing chamber of the CD controllable eductor may exhibit a non-circular cross-section.

In still another example, a CD controllable eductor of the present invention may comprise a housing having an entrained fluid inlet, a fluid outlet, a fluid mixing chamber, and two or more motive fluid inlets all of which are in fluid communication with one another, wherein at least two of the two or more motive fluid inlets are independently controllable to manage the flow of a motive fluid through the motive fluid inlets during operation of the eductor. The CD controllable eductor may further comprise a mixing chamber positioned between and in fluid communication with the entrained fluid inlet and the fluid outlet of the CD controllable eductor.

In one example, during operation of the CD controllable eductor, an entrained fluid entering the eductor through an entrained fluid inlet and a motive fluid entering the eductor through at least two of the two or more motive fluid inlets may contact one another in a mixing chamber of the eductor to form a mixed fluid. In one example, a motive fluid entering a CD controllable eductor of the present invention contacts an entrained fluid, for example an entrained fluid comprising a plurality of solid additives, at an angle of from about 0° to about 45° and/or from about 5° to about 30° and/or from about 10° to about 25° and/or at an angle of about 15°. In one example, at least one of the motive fluid inlets within a CD controllable eductor of the present invention comprises an area that is adjustable and/or controllable, for example before, during, and/or after operation. In one example, the CD controllable eductor of the present invention comprises two or more motive fluid inlets that comprise different areas.

In still another example, the CD controllable eductor of the present invention comprises a motive fluid that exhibits a pressure that is adjustable and/or controllable during operation of the eductor. In one example, the CD controllable eductor of the present invention comprises two or more motive fluid inlets that provide a motive fluid inlet that exhibits pressures that are adjustable and/or controllable during operation of the eductor.

In one example, the CD controllable eductor comprises a diffuser that is positioned between and in fluid communication with the eductor's mixing chamber and the eductor's fluid outlet. The diffuser may comprise a diffuser discharge angle that is adjustable and/or controllable, for example to avoid flow separation during operation. In one example, the diffuser's discharge angle may be greater than 0° to less than 90° and/or from about 5° to about 45° and/or from about 10° to about 30°.

In one example, the CD controllable eductor of the present invention may comprise at least one motive fluid delivery device that supplies motive fluid to at least one motive fluid inlet. Such a motive fluid delivery device may be and/or is in fluid communication with a motive fluid source. The CD controllable eductor may comprise a plurality of motive fluid delivery devices that each supply motive fluid to a respective motive fluid inlet within an eductor, for example during operation of the eductor.

The CD controllable eductor may comprise an entrained fluid inlet comprising an area that is adjustable and/or controllable. One or more of the entrained fluid inlets of the CD controllable eductors of the present invention may be and/or are in fluid communication with one or more solid additive sources. Non-limiting examples of solid additive sources include hammermills, fiber sources, solid additive spreaders, solid additive individualizers, air laying heads, forming heads, and mixtures thereof. In one example, the solid additive source is a hammermill. In another example, the solid additive source is a fiber source, for example a pulp fiber source, such as a wood pulp fiber source. The entrained fluid inlet supplies an entrained fluid to the housing, for example the mixing chamber, of the CD controllable eductor during operation of the eductor. In one example, the entrained fluid comprises solid additives, for example pulp fibers, such as wood pulp fibers.

In one example, the housing of the CD controllable eductor of the present invention may comprise one or more openings, for example one or more openings that are in fluid communication with a compressed air source for supplying compressed air into the housing during operation of the eductor.

In one example, the CD controllable eductor comprises a first set of two or more motive fluid inlets in a first position on the housing and a second set of two or more motive fluid inlets in a second position different from the first position on the housing. In another example, at least one of the motive fluid inlets of the first set is positioned at a distance of from about 0.5 to about 6 inches from at least one of the motive fluid inlets of the second set.

In one example, the housing of the CD controllable eductor comprising a housing that exhibits a minimum MD length of at least 0.5 inches between the entrained fluid inlet and the fluid outlet.

In one example, the CD controllable eductor comprises a housing that comprises one or more and/or two or more motive fluid inlets that are positioned between an entrained fluid inlet and a fluid outlet of the housing.

In another example, one or more of the eductors, for example spatially controllable eductors, such as CD controllable eductors, of the present invention may be used in a solid additive system that comprises one or more and/or two or more solid additive sources in fluid communication with one or more of the eductors. In one example, the solid additive system may comprise a single solid additive source in fluid communication with two or more of the eductors. In another example, the solid additive system may comprise two or more eductors that are independently controllable. One or more and/or two or more of the solid additive sources may be independently controllable. In one example, two or more of the solid additive sources may supply different solid additives. In another example, two or more of the solid additive sources may supply fluids with different properties.

In one example, a solid additive system of the present invention may comprise two or more solid additive sources in fluid communication with a single (sole) eductor.

In one example, a solid additive system according to the present invention may comprise a solid additive source and an eductor, for example a spatially controllable eductor, such as a CD controllable eductor, comprising a housing having an entrained fluid inlet and a fluid outlet, wherein the solid additive source is in fluid communication with the entrained fluid inlet and fluid outlet such that a fluid exiting the fluid outlet is wider (in the MD and/or CD) than a fluid exiting the solid additive source during operation of the eductor. The solid additive source may supply a fluid comprising one or more solid additives to the eductor.

In another example, a solid additive system according to the present invention may comprise a solid additive source and an eductor comprising a housing having an entrained fluid inlet and a fluid outlet, wherein the solid additive source is in fluid communication with the entrained fluid inlet and fluid outlet such that a fluid exiting the fluid outlet is wider (in the MD and/or CD) than a fluid exiting the entrained fluid inlet during operation of the eductor. The solid additive source may supply a fluid comprising one or more solid additives to the eductor.

In still another example, a cross-machine (CD) controllable eductor according to the present invention may comprise a housing having an entrained fluid inlet and a fluid outlet both of which are in fluid communication with one another such that a fluid exiting the fluid outlet is wider (in the MD and/or CD) than a fluid exiting the entrained fluid inlet during operation of the eductor.

In even another example, the eductor of the present invention may comprise a cross-machine (CD) controllable eductor.

Process Using a Spatially Controllable Eductor

The spatially controllable, for example CD controllable, eductors 30 of the present invention are useful in various processes known in the art, including, but not limited to, solid additive processes, for example fibrous structure making processes, for example coforming processes.

Figure 9:
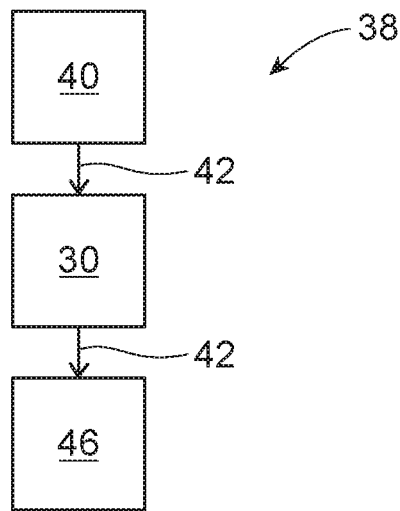
FIG. 9 is a schematic representation of a fibrous structure making process utilizing a spatially controllable, for example CD controllable, eductor according to the present invention.

As shown in FIGS. 8A-8B and 9, a non-limiting example of a process using a spatially controllable, for example CD controllable, eductor 30 is shown and described. FIGS. 8A-8B and 9 illustrate a solid additives process, for example a process that utilizes an entrained fluid 34 comprising a plurality of solid additives 36, such as fibers, for example pulp fibers, dispersed, for example randomly dispersed, within an air stream. The entrained fluid 34 may originate from a solid additive source 40, such as a hammer mill that fiberizes pulp fibers from bales of pulp. The solid additive source 40 may be in fluid communication with an entrained fluid inlet 16 of a spatially controllable, for example CD controllable, eductor 30. The entrained fluid 34 enters the fluid mixing chamber 14 defined by housing 12 of the spatially controllable, for example CD controllable, eductor 30 through the entrained fluid inlet 16.

A plurality of motive fluids 29 are supplied from a plurality of motive fluid delivery devices 32, which are in fluid communication with each of the respective variable motive fluid inlets 28. In this example, each variable motive fluid inlet 28 comprises segments/zones as shown in FIG. 7A through which at least one motive fluid 29 passes. This creates zones/regions within the variable motive fluid 26 exiting the variable motive inlet 28 as shown in FIG. 6. The variable motive fluid 26 exhibits different zones/regions across its CD profile, for example with respect to mass and/or flow and/or velocity CD profiles.

As shown in FIGS. 8A-8B, 9, and 10, which are schematic representations of a fibrous structure making process 38 according to the present invention, a fibrous structure making process 38 of the present invention may comprise a solid additive source 40, such as a hammer mill, an eductor, for example a spatially controllable, for example CD controllable, eductor 30, and a forming box 46 in fluid communication with each other, for example by pipes 42. The forming box 46 is where filaments 52 and the solid additives 36 commingle before being collected on a collection device 56, such as a fabric or belt, for example a patterned belt, with or without the aid of a vacuum box 58, to make a fibrous structure 60, for example a coform fibrous structure, comprising filaments 52 and solid additives 36.

As shown in FIGS. 8A, 8B, 9, and 10, the spatially controllable, for example CD controllable, eductor 30 of the present invention can be a component of a fibrous structure making process 38. The fibrous structure making process 38 comprises a solid additive source 40, such as a hammer mill, that delivers, for example by piping 42, solid additives 36 to one or more spatially controllable, for example CD controllable, eductors 30 in the form of an entrained fluid 34 comprising solid additives 36. The solid additives 36 are randomly dispersed within the entrained fluid 34. The entrained fluid 34 is delivered to a spatially controllable, for example CD controllable, eductor 30 positioned within its path from the solid additive source 40 to its end use. The spatially controllable, for example CD controllable, eductor 30 may be as shown and described in FIGS. 8A and 8B.

The spatially controllable, for example CD controllable, eductor 30 functions to create a desired CD profile of the solid additives 36 with respect to the solid additives' pressure and/or mass and/or flow and/or velocity. The entrained fluid 34 enters the spatially controllable, for example CD controllable, eductor 30 through the eductor's entrained fluid inlet 16. The entrained fluid 34 then enters the fluid mixing chamber 14 of the spatially controllable, for example CD controllable, eductor 30.

Within the fluid mixing chamber 14, the entrained fluid 34 is combined with variable motive fluids 26. The variable motive fluids 26 are introduced into the fluid mixing chamber 14 from two associated variable motive fluid inlets 28, for example a variable motive fluid according to the present invention, which may or may not be positioned opposite one another within the fluid mixing chamber 14. In one example, the spatially controllable, for example CD controllable, eductor 30 consists of a variable motive fluid inlet 28 positioned on only a single side of the fluid mixing chamber 14. The variable motive fluid 26 comprises two or more different zones/regions with respect to the mass and/or flow and/or velocity of the variable motive fluid 26 across its CD profile. This variable motive fluid 26 has the ability to convert the randomly dispersed solid additives 36 into a mixed fluid 44 comprising a non-random solid additives 36 CD profile with respect to the solid additives' mass and/or flow and/or velocity.

Figure 10:
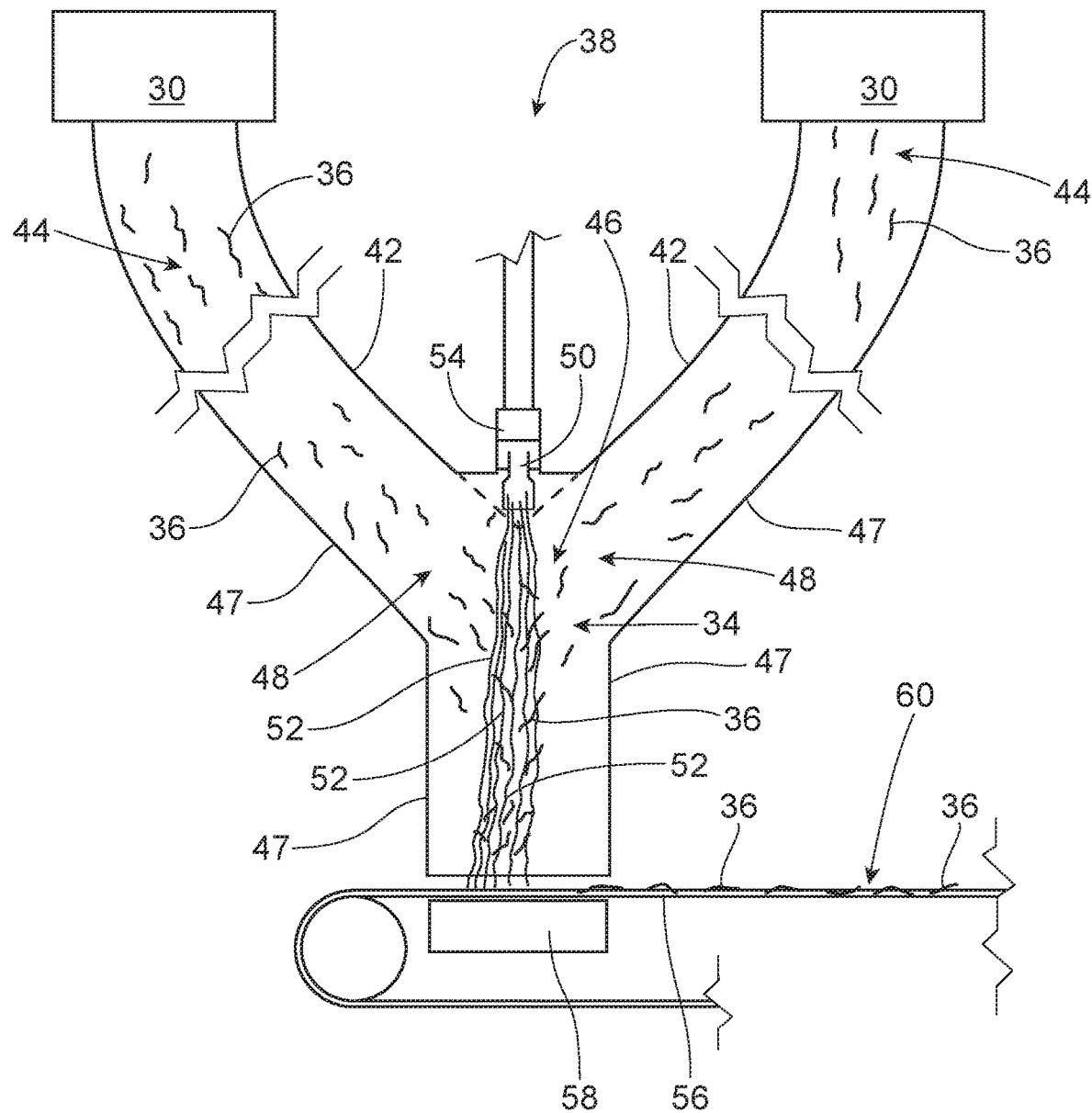
FIG. 10 is a schematic representation of an example of a forming box for use in a fibrous structure making process of the present invention.

The mixed fluid 44 exits the spatially controllable eductors 30 and is delivered to a forming box 46 via piping 42 while still maintaining the solid additives' CD profile. As shown in FIG. 10, the forming box 46 defined by a forming box housing 47 (which may be a continuation of the piping 42) that defines two or more solid additive inlets 48 through which the solid additives 36 enter the forming box 46. In addition to the solid additive inlets 48, the forming box 46 further comprises a filament inlet 50, through which filaments 52, such as polymer filaments, for example polypropylene filaments, from a filament source 54, such as a die, for example a meltblow die, for example a knife edge die and/or a multi-row capillary die, such as a multi-row capillary die commercially available from Biax-Fiberfilm Corporation, Greenville, Wis., and/or for example a spunbond die, are spun and supplied to the forming box 46 to be commingled with the solid additives 36.

The forming box housing 47 may be made from any suitable material such as metal, polycarbonate, or glass. In one example, the forming box 46 comprises an interior volume where at least a first discrete phase, for example one or more filaments 52, for example polymer filaments such as polyolefin filaments (e.g., polypropylene filaments), which enters the forming box 46 from die 54 through filament inlet 50, and at least a second discrete phase, for example one or more solid additives 36, such as fibers, for example pulp fibers (e.g., wood pulp fibers), which enters the forming box 46 through solid additive inlets 48, commingle.

In another example, commingling of the filaments 52 and the solid additives 36 may occur in the absence of a forming box 46. In other words, the commingling may occur in the ambient environment surrounding the equipment.

After commingling the filaments 52 and the solid additives 36 within a forming box 46 or in the absence of a forming box 46, the commingled filaments 52 and solid additives 36, which form a mixture 55, may then be collected on a collection device 56, such as a belt or fabric, for example a patterned belt, with or without the aid of a vacuum box 58, to create a fibrous structure 60, as shown in FIG. 10.

Figure 11A:
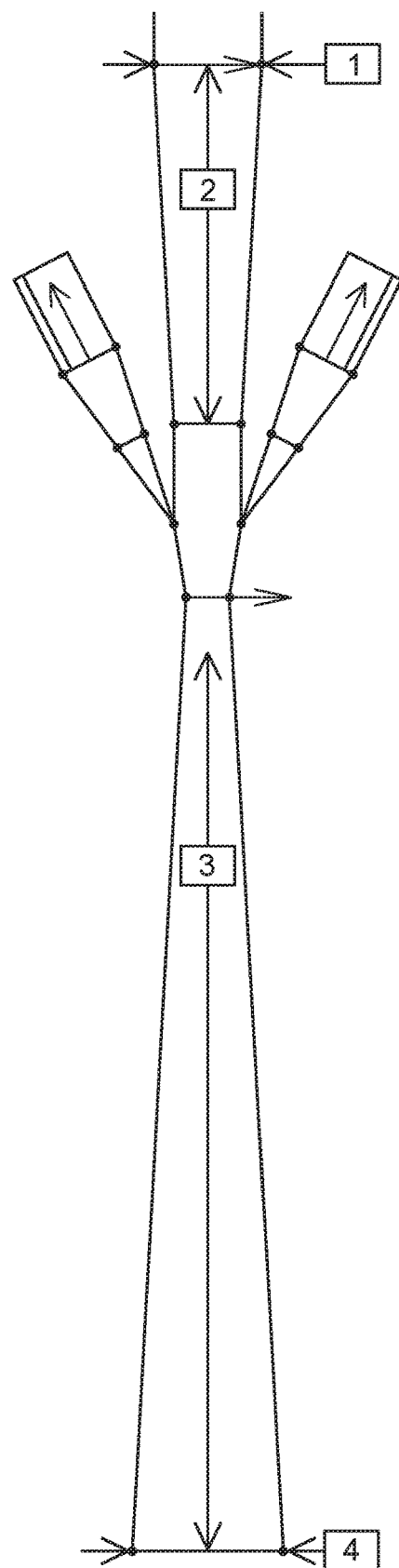
FIG. 11A is a schematic representation of an example of a spatially controllable eductor, for example a CD controllable eductor.
Figure 11B:
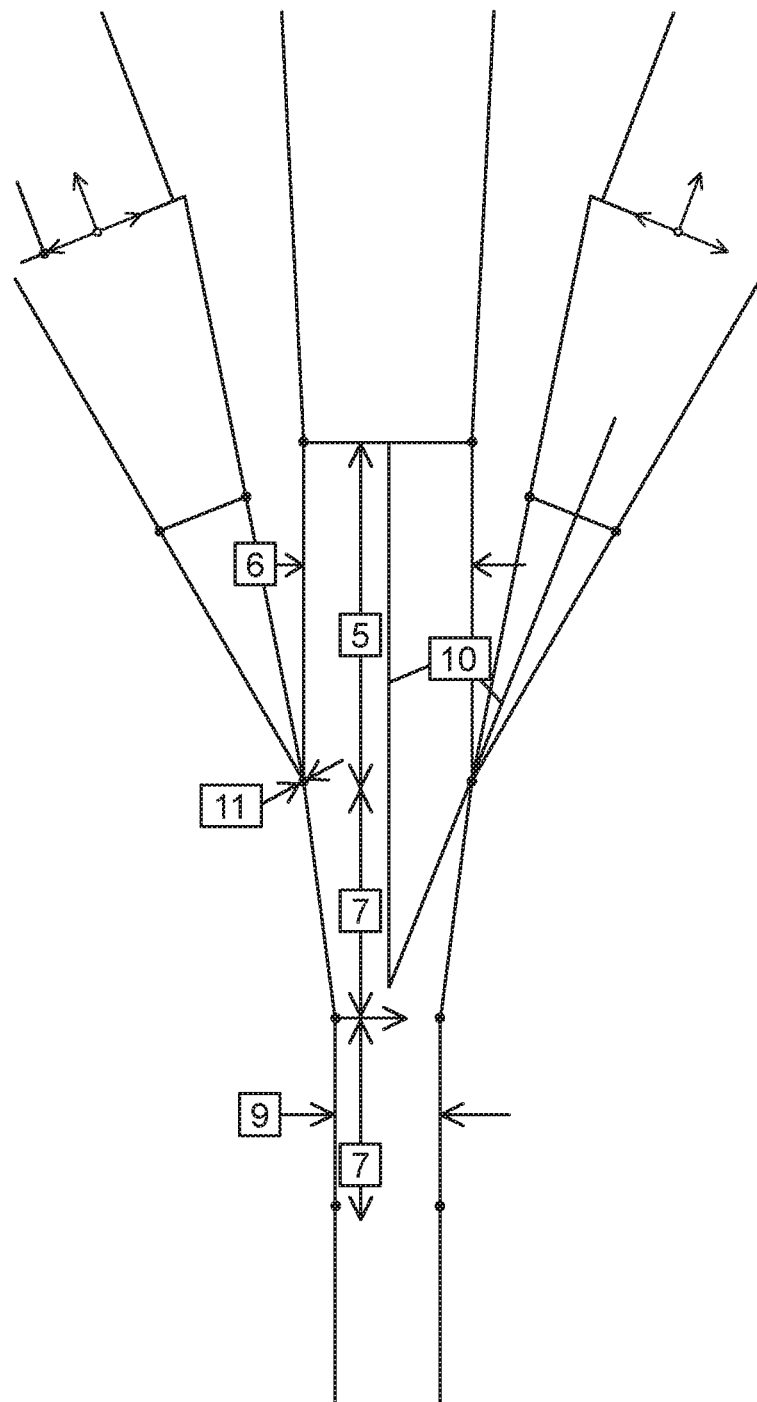
FIG. 11B is an enlarged portion of FIG. 11A.

In one example during operation of a spatially controllable, for example CD controllable, eductor 30 in accordance with the present invention as shown in FIGS. 11A and 11B air carries solid additives 36, for example pulp fibers, to the spatially controllable, for example CD controllable, eductor 30. The dimensions of the eductor 30 in this example as shown in FIGS. 11A and 11B are as follows: Dimension 1 (the width of the entrained fluid inlet) is about 3.2", Dimension 2 (length of converging part of duct after entrained fluid inlet) is about 12.73", Dimension 3 (length of diffuser) is at least 32", Dimension 4 (width of eductor's fluid outlet) is about 3.2", Dimension 5 (length of duct of entrained fluid inlet between converging part of duct of entrained fluid inlet to mixing chamber) is about 3.6", Dimension 6 (width of duct of entrained fluid inlet between converging part of duct of entrained fluid inlet to mixing chamber) is about 1.75", Dimension 7 (length of mixing chamber) is about 2.63", Dimension 8 (length of throat) is about 2.0", Dimension 9 (width of throat) is about 1.125", Dimension 10 (motive fluid inlet angle) is about 21°, and Dimension 11 (motive fluid slice) is 1.5 mm, 2.0 mm, or 4.0 mm.

In one example, a process for managing an entrained fluid according to the present invention comprises the steps of:
a. providing an eductor, for example a spatially controllable eductor, such as a CD controllable eductor according to the present invention; and
b. injecting an entrained fluid comprising a plurality of solid additives into the eductor.

In another example, a process for managing a plurality of solid additives according to the present invention comprises the steps of:
a. providing an entrained fluid comprising a plurality of solid additives;
b. injecting the entrained fluid comprising the solid additives into an eductor, for example a spatially controllable eductor, such as a CD controllable eductor according to the present invention; and
c. injecting one or more motive fluids into the one or more variable motive fluid inlets such that the entrained fluid comprising the solid additives and one or more variable motive fluids mix to form a mixed fluid.

In still another example, a process for making a fibrous structure according to the present invention comprises the steps of:
a. providing an entrained fluid comprising solid additives;
b. injecting the fluid comprising solid additives into an eductor, for example a spatially controllable eductor, such as a CD controllable eductor according to the present invention;
c. injecting one or more motive fluids into the one or more variable motive fluid inlets such that the entrained fluid comprising the solid additives and one or more variable motive fluids mix to form a mixed fluid;
d. passing the mixed fluid from the eductor to a forming box that is in fluid communication with the eductor;
e. introducing filaments into the forming box such that the filaments and the solid additives within the mixed fluid commingle to form a commingled material; and
f. depositing the commingled material onto a collection device from the forming box to form a fibrous structure.

In even another example, a process for making a fibrous structure according to the present invention comprises the steps of:
a. providing an entrained fluid comprising solid additives;
b. injecting the fluid comprising solid additives into an eductor, for example a spatially controllable eductor, such as a CD controllable eductor according to the present invention;
c. injecting one or more motive fluids into the one or more variable motive fluid inlets such that the entrained fluid comprising the solid additives and one or more variable motive fluids mix to form a mixed fluid;
d. combining filaments with the mixed fluid such that the filaments and the solid additives within the mixed fluid commingle to form a commingled material; and
e. depositing the commingled material onto a collection device to form a fibrous structure.

In another example of the present invention as shown in FIGS. 12A to 12E, a fibrous structure making process 38 comprises the steps of:
a. providing a filament source 54, for example a die, such as a spunbond die or a meltblow die;
b. supplying at least a first polymer to the filament source 54;
c. producing a plurality of filaments 52 comprising the first polymer from the filament source 54;
d. combining the filaments 52 with solid additives 36 delivered from a solid additive source (not shown), such as a hammermill and/or solid additive spreader and/or airlaying equipment such as a forming head, for example a forming head from Dan-Web Machinery A/S, and/or via an eductor, for example a spatially controllable eductor, such as a CD controllable eductor according to the present invention, inside a forming box 46 defined by a forming box housing 47 that defines a forming box's volume such that the filaments 52 and solid additives 36 contact each other at a 90° angle and/or at a non-90° angle, for example at an angle of less than 90° and/or less than 85° and/or less than 75° and/or less than 45° and/or less than 30° and/or to about 0° and/or to about 10° and/or to about 25°, relative to each other to form a mixture 55; and
e. collecting the mixture 55 on a collection device 56, such as a fabric and/or belt, for example a patterned belt that imparts a pattern, for example a non-random, repeating pattern to a fibrous structure, with or without the aid of a vacuum box 58, to produce a fibrous structure 60 comprising filaments 52 and solid additives 36.

Figure 12A:
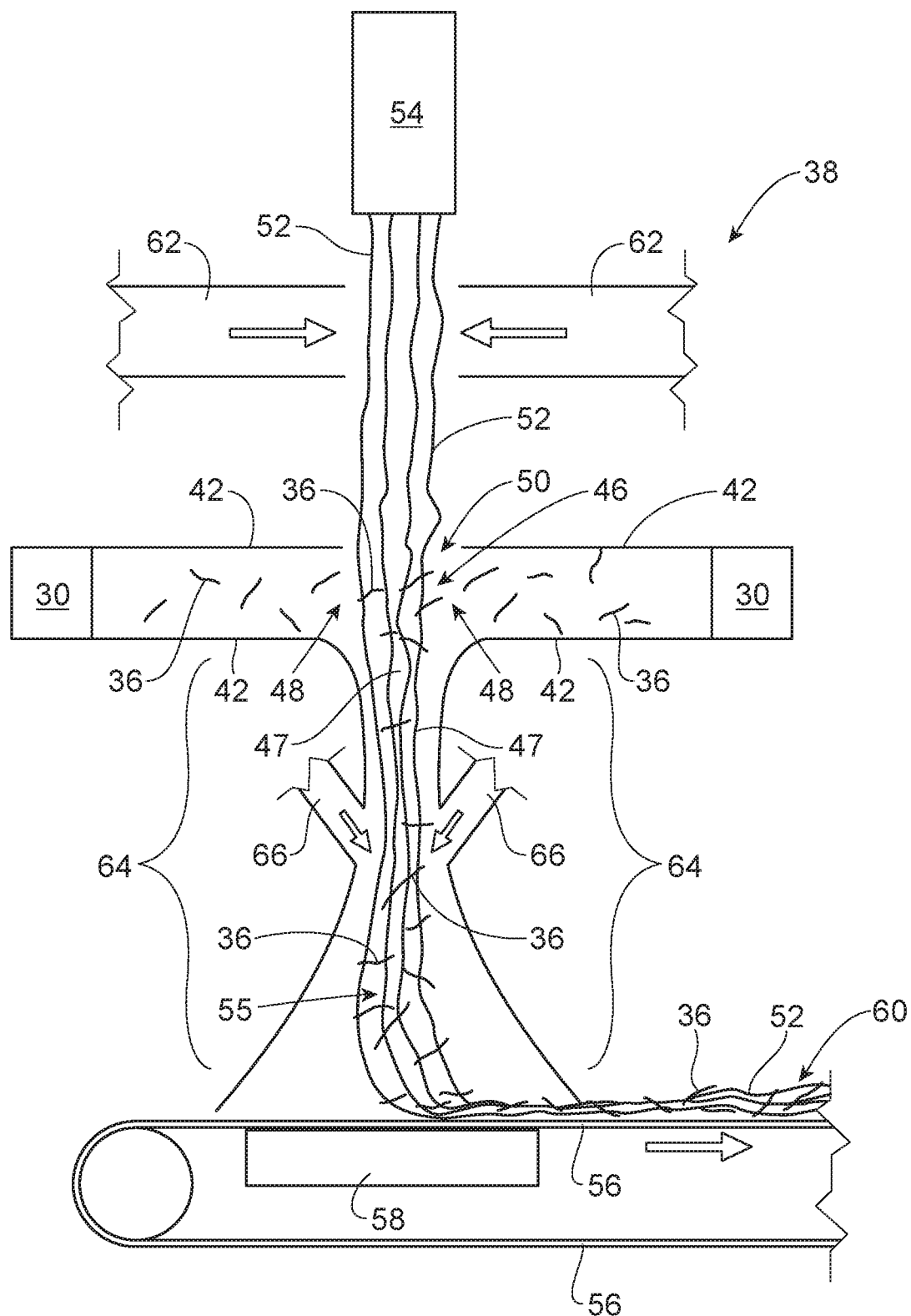
FIG. 12A is a schematic representation of another example of a fibrous structure making process according to the present invention.
Figure 12B:
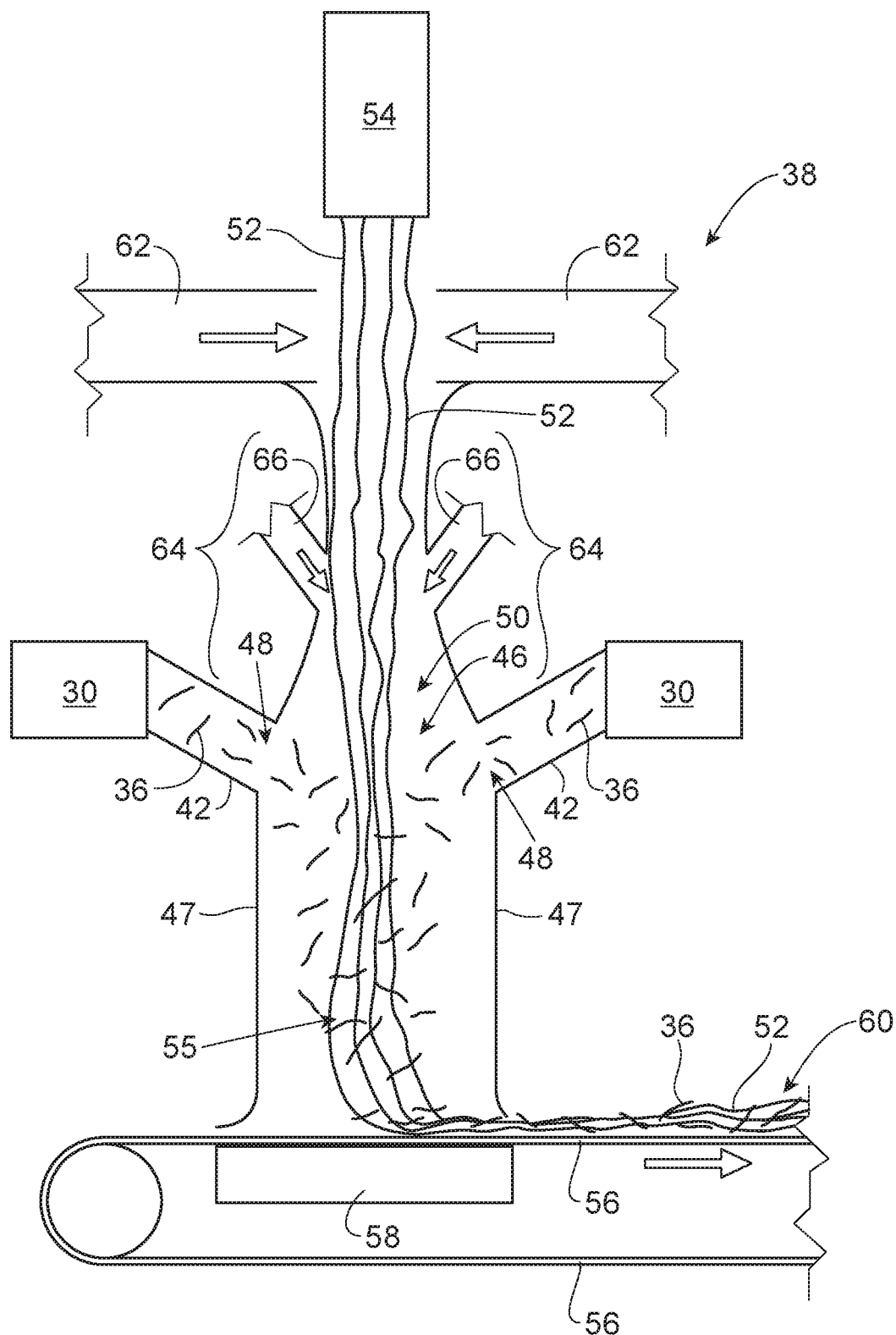
FIG. 12B is a schematic representation of another example of a fibrous structure making process according to the present invention.
Figure 12C:
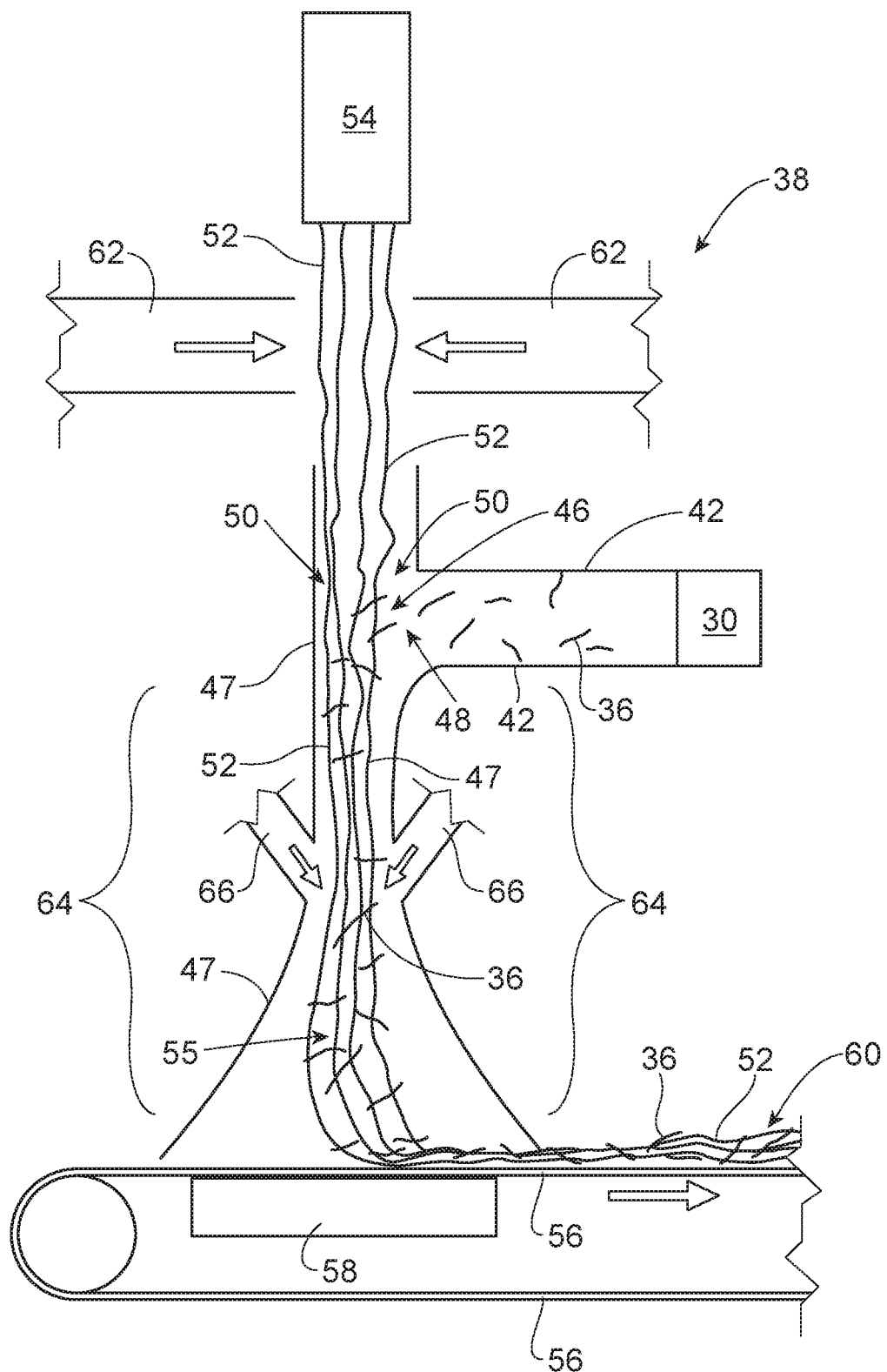
FIG. 12C is a schematic representation of another example of a fibrous structure making process according to the present invention.
Figure 12D:
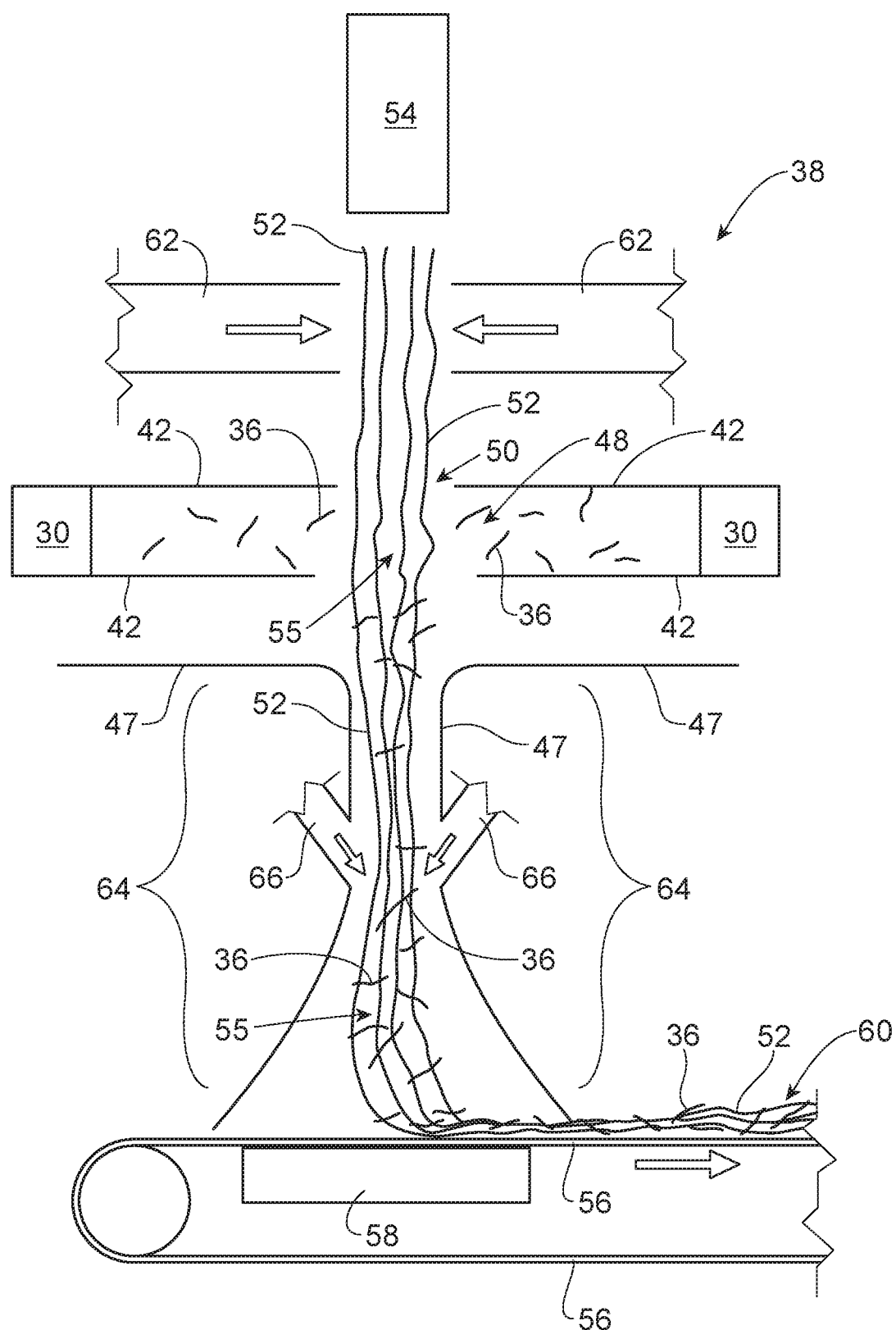
FIG. 12D is a schematic representation of another example of a fibrous structure making process according to the present invention.
Figure 12E:
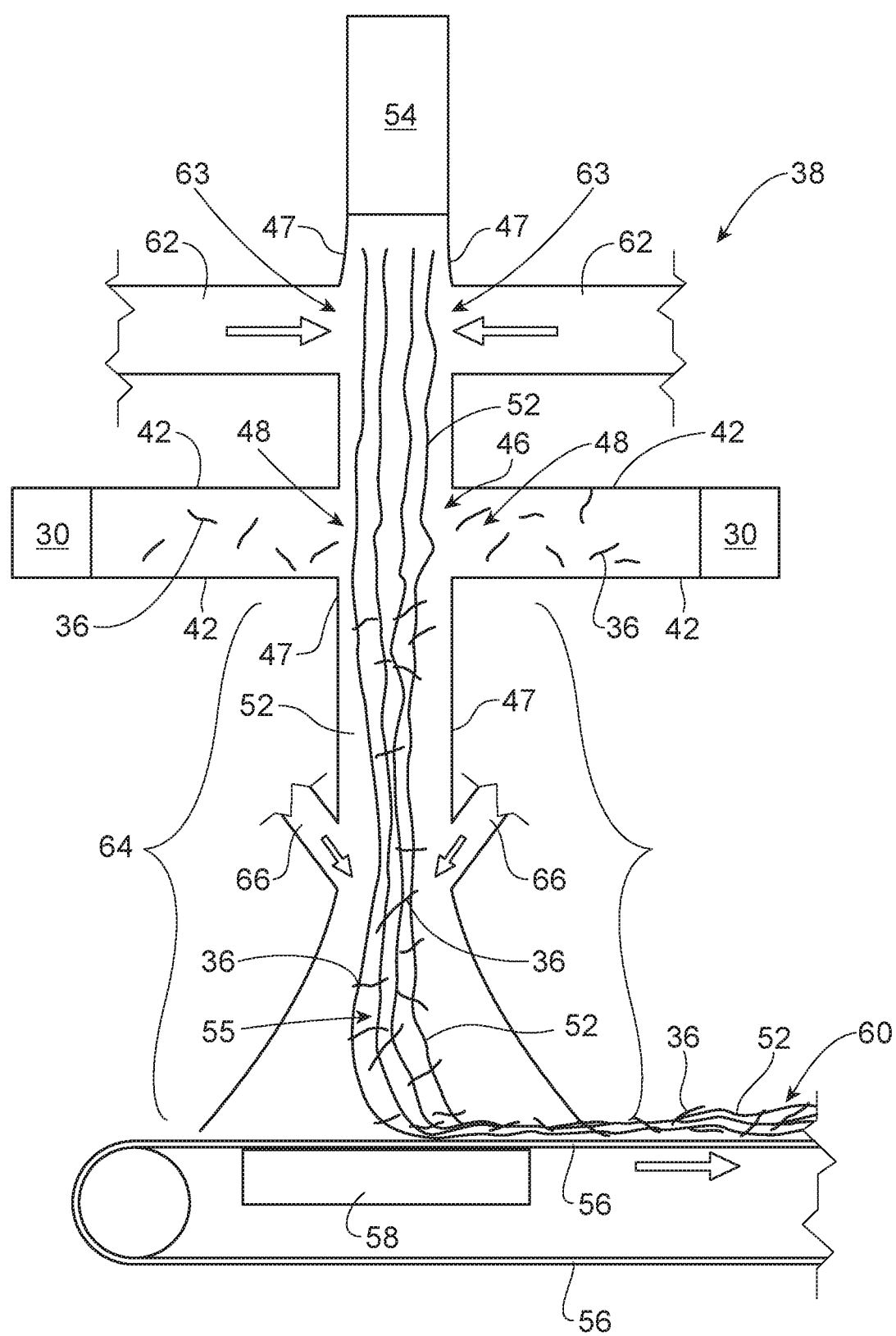
FIG. 12E is a schematic representation of another example of a fibrous structure making process according to the present invention.

The fibrous structure making process 38 as shown in FIGS. 12A to 12E may further comprise one or more air sources 62, such as cooling air, quenching air, and/or drying air. In one example, as shown in FIG. 12E the components of the fibrous structure making process 38, for example the one or more filament sources 54, the one or more air sources 62, the forming box 46 along with its inlets 48 and 50 may all be connected to one another by the forming box housing 47.

In another example, as shown in FIGS. 12A to 12E, the fibrous structure making process 38 may further comprise a venturi attenuation zone 64. In one example, the venturi attenuation zone 64 comprises one or more high velocity air sources 66 that delivers high velocity air to the filaments 52 prior to the forming box 46 (as shown in FIG. 12B) and/or to the mixture 55 of filaments 52 and solid additives 36 after the forming box 46 (as shown in FIGS. 12A, 12C, 12D, and 12E).

In one example, during operation, as shown in FIG. 12B, the filament source 54 receives molten polymer, for example a polyolefin, such as polypropylene, under pressure. This molten polymer is then spun via pressure from the filament source 54 (for example a die) to form filaments 52. The filaments 52 are subjected to cooling air, from one or more air sources 62, which serves to lower the molten polymer to below its freezing temperature. The filaments 52 continue traveling toward the collection device 56 and are aided in attenuation by the venturi attenuation zone 64. Subsequent to the venturi attenuation zone 64, one or more solid additives 36—laden flow is then introduced into the filaments 52 in the forming box 46. The filaments 52 are aided in attenuation by the venturi attenuation zone 64. The mixture 55 is then collected on the collection device 56, with or without the aid of the vacuum box 58, to form the fibrous structure 60 comprising filaments 52 and solid additives 36. The fibrous structure 60 may then be subjected to further post processing operations such as thermal bonding, embossing, tuft-generating operations, slitting, cutting, perforating, and other converting operations.

In another example, during operation, as shown in FIGS. 12A, 12C, 12D, and 12E, the filament source 54 receives molten polymer, for example a polyolefin, such as polypropylene, under pressure. This molten polymer is then spun via pressure from the filament source 54 (for example a die) to form filaments 52. The filaments 52 are subjected to cooling air, from one or more air sources 62, which serves to lower the molten polymer to below its freezing temperature. The filaments 52 continue traveling toward the collection device 56. One or more solid additives 36—laden flow is then introduced into the filaments 52 in the forming box 46. The filaments 52 are aided in attenuation by the venturi attenuation zone 64. The mixture 55 is then collected on the collection device 56, with or without the aid of the vacuum box 58, to form the fibrous structure 60. The fibrous structure 60 may then be subjected to further post processing operations such as thermal bonding, embossing, tuft-generating operations, slitting, cutting, perforating, and other converting operations.

In one example, the forming box 46 (coform box), as shown in FIG. 12E, comprises one or more filament inlets 50, one or more cooling air inlets 63 through which cooling air enters the forming box housing 47 from one or more air sources 62, one or more solid additive inlets 48, and one or more venturi attenuation zones 64, which aid in attenuation filaments 52 passing through the forming box 46 and/or the forming box housing 47 defining the forming box 46.

The forming box 46 may comprise one or more first material inlets, for example one or more filament inlets 50 through which one or more filaments 52, for example spunbond filaments, are introduced into the forming box 46, and one or more second material inlets, for example one or more solid additive inlets 48 through which one or more solid additives 36, such as fibers, are introduced into the forming box 46 such that one or more filaments 52 contact the one or more solid additives 36, for example fibers, inside the forming box's volume.

As shown in FIGS. 12A to 12E, the fibrous structure making process 38 of the present invention may comprise one or more eductors 30, for example a spatially controllable eductor, such as a CD controllable eductor according to the present invention, that is arranged to deliver solid additives, for example fibers, such as pulp fibers, to a forming box, such as being connected via straight piping, if any, (such that the there are no bends, curves, or other barriers) such that the solid additives are delivered to the forming box and/or into contact with the filaments in the fibrous structure making process.

Non-Limiting Example

An example of a fibrous structure according to the present invention in made as follows. A 47.5%:27.5%:18%:5%:2% blend of Exxon-Mobil PP3546 polypropylene: Lyondell-Basell Metocene MF650W polypropylene: Lyondell-B as ell PH835 polypropylene: Polyvel S-1416 wetting agent: Ampacet 412951 $TiO_2$ master batch is dry blended, to form a melt blend. The melt blend is heated to 400° F. through a melt extruder. A 15.5 inch wide Biax 12 row spinnerette with 192 nozzles per cross-direction inch, commercially available from Biax Fiberfilm Corporation, is utilized. 40 nozzles per cross-direction inch of the 192 nozzles have a 0.018 inch inside diameter while the remaining nozzles are solid, i.e. there is no opening in the nozzle. Approximately 0.19 grams per hole per minute (ghm) of the melt blend is extruded from the open nozzles to form meltblown filaments from the melt blend. Approximately 450 SCFM of compressed air is heated such that the air exhibits a temperature of about 201° C. at the spinnerette.

Approximately 350 g/minute of pulp is fed into the hammer mill, the pulp blend comprising approximately 49% Golden Isle (from Georgia Pacific) 4825 semi-treated SSK pulp and 51% eucalyptus fibers is defibrillated through a hammermill to form a blend of SSK and eucalyptus wood pulp fibers (solid additives). Air at 85-90° F. and 85% relative humidity (RH) is drawn into the hammermill. Approximately 1200 SCFM of air carries the pulp fibers to one or more spatially controllable, for example CD controllable, eductors 30 according to the present invention as shown in FIGS. 11A and 11B. The dimensions of the eductor 30 in this example as shown in FIGS. 11A and 11B are as follows: Dimension 1 (the width of the entrained fluid inlet) is about 3.2", Dimension 2 (length of converging part of duct after entrained fluid inlet) is about 12.73", Dimension 3 (length of diffuser) is at least 32", Dimension 4 (width of eductor's fluid outlet) is about 3.2", Dimension 5 (length of duct of entrained fluid inlet between converging part of duct of entrained fluid inlet to mixing chamber) is about 3.6", Dimension 6 (width of duct of entrained fluid inlet between converging part of duct of entrained fluid inlet to mixing chamber) is about 1.75", Dimension 7 (length of mixing chamber) is about 2.63", Dimension 8 (length of throat) is about 2.0", Dimension 9 (width of throat) is about 1.125", Dimension 10 (motive fluid inlet angle) is about 21°, and Dimension 11 (motive fluid slice) is 1.5 mm, 2.0 mm, or 4.0 mm. The eductor 30 comprises variable motive fluid inlets 28 positioned on both sides of the fluid mixing chamber 14. The variable motive fluid 26 comprises two or more different zones/regions with respect to the pressure and/or mass and/or flow and/or velocity of the variable motive fluid 26 across its CD profile. This variable motive fluid 26 has the ability to convert the randomly dispersed solid additives 36 into a mixed fluid 44 comprising a non-random solid additives 36 CD profile with respect to the solid additives' pressure and/or mass and/or flow and/or velocity. The mixed fluid 44 exits the spatially controllable eductor 30 and is delivered to a forming box 46 via piping 42 while still maintaining the solid additives' CD profile.

The forming box 46 comprises two or more solid additive inlets 48 through which the solid additives 36 enter the forming box 46. As shown in FIG. 10, in addition to the solid additive inlets 48, the forming box 46 further comprises a filament inlet 50, through which filaments 52, such as polymer filaments, for example polypropylene filaments, from a filament source 54, such as a die, for example a meltblow die, for example a knife edge die and/or a multi-row capillary die, such as a multi-row capillary die commercially available from Biax-Fiberfilm Corporation, Greenville, Wis., are spun and supplied to the forming box 46 to be commingled with the solid additives 36. The spatially controllable eductor distributes the pulp fibers in the cross-direction such that the pulp fibers are injected into the meltblown filaments at a 45 degree angle through a 4 inch×15 inch cross-direction (CD) slot. A forming box surrounds the area where the meltblown filaments and pulp fibers are commingled. This forming box is designed to reduce the amount of air allowed to enter or escape from this commingling area; however, there is an additional 4 inch×15 inch spreader opposite the solid additive spreader designed to add cooling air. Approximately 1200 SCFM of air at approximately 80° F. is added through this additional spreader. A forming vacuum pulls air through a collection device, such as a patterned belt, thus collecting the commingled meltblown filaments and pulp fibers to form a fibrous structure, for example a core, comprising a pattern of non-random, repeating microregions. The fibrous structure formed by this process comprises about 75% by dry fibrous structure weight of pulp and about 25% by dry fibrous structure weight of meltblown filaments.

Optionally, a meltblown layer of the meltblown filaments can be added to one or both sides, in this case both sides of the above formed fibrous structure (core) as a scrim. This addition of the meltblown layer can help reduce the lint created from the fibrous structure during use by consumers and is preferably performed prior to any thermal bonding operation of the fibrous structure. The meltblown filaments for the exterior layers can be the same or different than the meltblown filaments used on the opposite layer or in the center layer(s).

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A process for managing a mixed fluid, the process comprising the steps of:
   a. providing a CD (cross-machine direction) controllable eductor comprising one or more motive fluid inlets such that at least one of the motive fluid inlets is segmented into two or more independently controllable CD zones such that during operation of the CD controllable eductor a motive fluid passing through one independently controllable CD zone of the at least one segmented motive fluid inlet exhibits different properties from the motive fluid passing through at least one other independently controllable CD zone of the same at least one segmented motive fluid inlet;
   b. injecting a motive fluid into the CD controllable eductor;
   c. injecting an entrained fluid into the CD controllable eductor to form a mixed fluid comprising the motive fluid and the entrained fluid; and
   d. operating the CD controllable eductor such that the mixed fluid is managed.

2. The process according to claim 1 wherein the entrained fluid comprises a plurality of solid additives.

3. The process according to claim 2 wherein the plurality of solid additives comprise a plurality of fibers.

4. The process according to claim 3 wherein the plurality of fibers comprise a plurality of wood pulp fibers.

5. The process according to claim 1 wherein the at least one motive fluid inlet is a variable motive fluid inlet.

6. The process according to claim 5 wherein the variable motive fluid inlet comprises two or more zones.

7. The process according to claim 6 wherein at least one of the zones is independently controllable from another of the zones.

8. The process according to claim 1 wherein at least one of the motive fluid inlets is in fluid communication with one or more motive fluid delivery devices.

9. The process according to claim 1 wherein the eductor further comprises one or more entrained fluid inlets.

10. The process according to claim 9 wherein the eductor further comprises a fluid mixing chamber in fluid communication with at least one of the entrained fluid inlets and at least one of the motive fluid inlets.

11. The process according to claim 1 wherein the eductor further comprises one or more fluid outlets.

12. A process for managing a mixed fluid, the process comprising the steps of:
   a. providing a CD (cross-machine direction) controllable eductor comprising a housing having an entrained fluid inlet, a fluid outlet, a fluid mixing chamber, and two or more motive fluid inlets all of which are in fluid communication with one another, wherein at least two of the two or more motive fluid inlets are independently controllable to manage the flow of a CD variable motive fluid through at least one of the motive fluid inlets, wherein the at least one motive fluid inlet is segmented into two or more independently controllable CD zones such that during operation of the CD controllable eductor a motive fluid passing through one independently controllable CD zone of the at least one segmented motive fluid inlet exhibits different properties from the motive fluid passing through at least one other independently controllable CD zone of the same at least one segmented motive fluid inlet;

b. injecting a motive fluid into the CD controllable eductor;

c. injecting an entrained fluid into the CD controllable eductor to form a mixed fluid comprising the motive fluid and the entrained fluid; and d. operating the CD controllable eductor such that the mixed fluid is managed.

13. The process according to claim 12 wherein the fluid mixing chamber is positioned between and in fluid communication with the entrained fluid inlet and the fluid outlet.

14. The process according to claim 12 wherein the entrained fluid entering the CD controllable eductor through the entrained fluid inlet and the motive fluid entering the CD controllable eductor through the at least two of the two or more motive fluid inlets contact one another in the fluid mixing chamber during operation of the CD controllable eductor to form a mixed fluid.

15. The process according to claim 14 wherein the motive fluid contacts the entrained fluid at an angle of from about 0° to about 45°.

16. The process according to claim 12 wherein at least one of the two or more motive fluid inlets comprises an area that is adjustable.

17. The process according to claim 12 wherein the motive fluid exhibits a pressure that is controllable during operation of the CD controllable eductor.

18. The process according to claim 12 wherein the CD controllable eductor further comprises a diffuser that is positioned between and in fluid communication with the fluid mixing chamber and the fluid outlet.

19. The process according to claim 12 wherein the CD controllable eductor further comprises at least one motive fluid delivery device that supplies the motive fluid to at least one motive fluid inlet.

20. The process according to claim 12 wherein the entrained fluid comprises a plurality of solid additives.

* * * * *